(12) United States Patent
Kim et al.

(10) Patent No.: US 9,781,711 B2
(45) Date of Patent: Oct. 3, 2017

(54) EFFECTIVE METHOD FOR TRANSMITTING CONTROL INFORMATION DURING THE COMBINATION OF MULTIPLE CARRIERS FOR WIDEBAND SUPPORT

(71) Applicant: LG ELECTRONICS INC., Seoul (KR)

(72) Inventors: So Yeon Kim, Gyeonggi-do (KR); Jae Hoon Chung, Gyeonggi-do (KR); Yeong Hyeon Kwon, Gyeonggi-do (KR); Seung Hee Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 14/694,503

(22) Filed: Apr. 23, 2015

(65) Prior Publication Data
US 2015/0230230 A1    Aug. 13, 2015

Related U.S. Application Data

(62) Division of application No. 13/143,101, filed as application No. PCT/KR2010/000013 on Jan. 4, 2010, now Pat. No. 9,247,532.

(Continued)

(51) Int. Cl.
*H04W 4/00* (2009.01)
*H04W 72/04* (2009.01)
*H04L 5/00* (2006.01)

(52) U.S. Cl.
CPC .......... *H04W 72/042* (2013.01); *H04L 5/001* (2013.01); *H04L 5/006* (2013.01); *H04L 5/0037* (2013.01);

(Continued)

(58) Field of Classification Search
CPC .......... H04W 72/0406; H04W 72/0453; H04L 5/0053; H04L 5/001; H04L 5/0037; H04L 5/006; H04L 5/0092

(Continued)

(56) References Cited

U.S. PATENT DOCUMENTS

| | | |
|---|---|---|
| 2004/0029579 A1 | 2/2004 | Kashiwase |
| 2008/0112383 A1 | 5/2008 | Li |

(Continued)

FOREIGN PATENT DOCUMENTS

| | | |
|---|---|---|
| KR | 10-0588727 B1 | 6/2006 |
| KR | 10-2008-0021159 A | 3/2008 |
| WO | 2007/091795 A1 | 8/2007 |

OTHER PUBLICATIONS

Office Action dated Nov. 21, 2014, issued by the U.S. Patent & Trademark Office in U.S. Appl. No. 13/125,505.

(Continued)

*Primary Examiner* — Sai-Ming Chan
(74) *Attorney, Agent, or Firm* — Morgan, Lewis & Bockius LLP

(57) ABSTRACT

The present invention relates to wideband wireless access system, and more particularly to an effective method for transmitting control information during the combination of multiple carriers. As one embodiment of the present invention, there is provided a method by which a base station allocates a carrier to a terminal in a wideband wireless access system supporting multiple carriers, the method comprising: transmitting, to the terminal, a terminal specific or terminal group specific carrier allocation information that includes information about at least one of control information and data; and transmitting, to the terminal, a carrier combination control information that includes information about a change in the at least one candidate carrier available.

20 Claims, 8 Drawing Sheets

(a)

(b)

Related U.S. Application Data

(60) Provisional application No. 61/254,213, filed on Oct. 23, 2009, provisional application No. 61/177,637, filed on May 12, 2009, provisional application No. 61/155,867, filed on Feb. 26, 2009, provisional application No. 61/142,220, filed on Jan. 2, 2009.

(52) U.S. Cl.
CPC .......... *H04L 5/0053* (2013.01); *H04L 5/0092* (2013.01); *H04W 72/0406* (2013.01); *H04W 72/0453* (2013.01)

(58) Field of Classification Search
USPC ........................................................ 370/329
See application file for complete search history.

(56) References Cited

U.S. PATENT DOCUMENTS

| | | | |
|---|---|---|---|
| 2008/0159248 A1 | 7/2008 | Li | |
| 2008/0188260 A1 | 8/2008 | Xiao et al. | |
| 2008/0259863 A1 | 10/2008 | Zhang et al. | |
| 2008/0287068 A1 | 11/2008 | Etemad | |
| 2009/0010219 A1 | 1/2009 | Lee et al. | |
| 2009/0028103 A1 | 1/2009 | Wang et al. | |
| 2010/0034303 A1* | 2/2010 | Damnjanovic | H04L 5/003 375/260 |
| 2010/0118720 A1 | 5/2010 | Gauvreau et al. | |
| 2010/0118836 A1 | 5/2010 | Kazmi et al. | |
| 2010/0157927 A1 | 6/2010 | Mochizuki et al. | |
| 2010/0238872 A1 | 9/2010 | Kim et al. | |
| 2011/0310795 A1 | 12/2011 | Andersson et al. | |
| 2015/0124755 A1* | 5/2015 | Gauvreau | H04W 72/048 370/329 |

OTHER PUBLICATIONS

Office Action issued in technologically related U.S. Appl. No. 13/125,505 dated Jun. 19, 2014.
Office Action dated Sep. 23, 2011, issued by the U.S. Patent & Trademark Office in U.S. Appl. No. 13/143,101.
Office Action dated Apr. 10, 2015, issued by the U.S. Patent & Trademark Office in U.S. Appl. No. 13/125,505.
NTT DoCoMo, "Initial Access Procedure for Asymmetric Wider Bandwidth in LTE-Advanced," 3GPP TSG RAN WG1 Meeting #54bis, R1-083680, 2008.
Huawei, "DL/UL Asymmetric Carrier aggregation," 3GPP TSG-RAN-WG1 Meeting #54bis, R1-083706, 2008.
Office Action issued in U.S. Appl. No. 13/125,505 dated Nov. 8, 2013.
Written Opinion and International Search Report issued in corresponding International Application No. PCT/KR2009/006125 mailed Jun. 1, 2010.
Office Action dated Feb. 24, 2017, issued by the U.S. Patent & Trademark Office in U.S. Appl. No. 15/240,524.

* cited by examiner (a)

(b)

EFFECTIVE METHOD FOR TRANSMITTING CONTROL INFORMATION DURING THE COMBINATION OF MULTIPLE CARRIERS FOR WIDEBAND SUPPORT

CROSS REFERENCE TO RELATED APPLICATIONS

The present application is a divisional of U.S. patent application Ser. No. 13/143,101, filed on Sep. 23, 2011, the entire disclosure of which is hereby incorporated by reference for all purposes as if fully set forth herein. U.S. patent application Ser. No. 13/143,101 is a U.S. National Stage Entry of PCT International Application No. PCT/KR2010/000013, filed on Jan. 4, 2010, and claims the benefit of U.S. Provisional Applications No. 61/142,220, filed on Jan. 2, 2009; No. 61/155,867, filed on Feb. 26, 2009; No. 61/177,637, filed on May 12, 2009; and No. 61/254,213, filed on Oct. 23, 2009.

FIELD OF THE INVENTION

The present invention related to a wideband wireless access system and, more particularly, to an effective method for transmitting control information during the combination of multiple carriers.

BACKGROUND ART

Hereinafter a Carrier will be briefly described.

A user may include information that the user wishes to transmit by performing modulation operations on amplitude, frequency, and/or phase of a sine wave or a periodic pulse wave. At this point, the sine wave or pulse wave, which performs the function of carrying information, is referred to as a carrier.

Methods for modulating carriers may include an SCM (Single-Carrier Modulartion scheme) or an MCM (Multi-Carrier Modulation scheme). Herein, the Single-Carrier Modulation scheme (SCM) refers to a modulation scheme, wherein all types of information is loaded in a single carrier and then modulated.

The Multi-Carrier Modulation scheme refers to a modulation technique that can divide a whole Bandwidth Channel of a single carrier into multiple sub-channels each having a small bandwidth and that can perform multi-transmission through a plurality of narrowband Sub-Carriers.

At this point, when using the Multi-Carrier Modulation (MCM) scheme, each sub-channel may be approximated to a Flat Channel fur to the small bandwidth. Additionally, the user may compensate for any channel distortion by using a simple equalizer. Furthermore, high-speed implementation of the Multi-Carrier Modulation scheme may be performed by using Fast Fourier Transform (FFT). In other words, the Multi-Carrier Modulation scheme is more advantageous in high-speed data transmission as compared to the Single-Carrier Modulation (SCM) scheme.

As the functions of base stations and/or user equipments evolve, the frequency bandwidth that can be provided by or used in the base stations and/or user equipments is expanding. Therefore, according to the exemplary embodiments of the present invention, the present invention discloses a multi-carrier system that supports wideband by performing Carrier aggregation, wherein one or more carriers are combined and used (or aggregated).

More specifically, unlike the above-described Multi-Carrier Modulation Scheme, wherein a single carrier is divided and shared, the multi-carrier system that will be described below corresponds to the case when one or more carriers are combined (or grouped) and used.

In order to efficiently use the Multi-Band (or Multi-Carrier), a technique of having a single Medium Access Control (MAC) entity manage multiple carriers (e.g., multiple Frequency Carriers (FCs)) has been proposed.

(a) and (b) of FIG. 1 illustrate a method for transmitting and receiving multiple bandwidth Radio Frequency (RF) based signals.

As shown in FIG. 1, in the transmitting end and in the receiving end, in order to efficiently use multiple carriers, one Medium Access Control (MAC) layer may manage multiple carriers. At this point, it is assumed that, in order to efficiently transmit and receive multiple carriers, the transmitting and the receiving end can transmit and receive all of the multiple carriers. At this point, since the Frequency Carriers (FCs), which are managed by a single Medium Access Control (MAC) layer, are not required to be contiguous to one another, this technique is more flexible in the aspect of resource management. More specifically, Contiguous Aggregation and Non-contiguous Aggregation may both be performed.

Referring to (a) and (b) of FIG. 1, Physical Layer (PHY) 0, Physical Layer (PHY) 1, . . . Physical Layer (PHY) n-2, Physical Layer (PHY) n-1 indicate the multi-band according to technique of present invention, and each band may have a frequency carrier (FC) size, which is assigned for a specific service based upon a pre-decided frequency policy. For example, Physical Layer 0 (RF carrier 0) may have a frequency carrier (FC) size, which is assigned for general FM radio broadcasting, and Physical Layer 1 (RF carrier 1) may have a frequency carrier (FC) size, which is assigned for mobile phone communication.

As described above, depending upon the characteristics of each frequency band, each of the frequency bands may have a different frequency band size. However, in the following description, it is assumed that each frequency carrier (FC) has a size of A [MHz]. Also, each frequency allocation band may be represented as a carrier frequency enabling each frequency band to use a baseband signal. Hereinafter, each frequency allocation band will be referred to as a "Carrier Frequency Band" or, when there is no confusion, each frequency allocation band will be merely referred to as a "Carrier", which represents each carrier frequency band. Furthermore, as in the recent 3GPP LTE-A, the above-described carrier may also be referred to as a "component carrier" in order to be differentiated from the subcarrier, which is used in the multi-carrier scheme.

In this aspect, the above-described "Multi-Band" scheme may also be referred to as a "Multi-Carrier" scheme or a "carrier aggregation" scheme.

In order to transmit a signal through a multi-band, as shown in (a) of FIG. 1, and in order to receive a signal through a multi-band, as shown in (b) of FIG. 1, the transmitter/receiver is/are required to include a radio frequency (RF) module, which is configured to transmit and receive signals through all of the multi-band. Also, referring to FIG. 1, a configuration method of "Medium Access Control" is decided by the base station regardless of a downlink (DL) and an uplink (UL).

In short, the technique of the present invention refers to a technique for transmitting/receiving signals by having a single medium access control entity to manage/operate multiple radio frequency carriers (RF carriers). RF carriers being managed by a single medium access control are not required to be contiguous to one another. Therefore, according to the technique of the present invention, the multi-band scheme is advantageous in that it is more flexible in the aspect of resource management.

FIG. 2 illustrates an exemplary method for allocating a frequency in a multi-carrier system.

Referring to FIG. 2, frequency carrier 0 to frequency carrier 7 may be managed by radio frequency 0 to radio frequency 7. Also, as shown in the example shown in FIG. 2, it is assumed that frequency carrier 0, frequency carrier 2, frequency carrier 3, frequency carrier 6, and frequency carrier 7 are already assigned to each specific conventional communication service. Meanwhile, available frequency carrier 1, frequency carrier 4, and frequency carrier 5 may be effectively managed by a single medium access control (medium access control #5). Herein, as described above, since the frequency carriers configuring a single medium access control are not required to be contiguous to one another, the frequency resource may be more effectively managed.

However, the above-described multi-band based communication scheme may only be defined more or less conceptually, and, whenever required, the multi-band based communication scheme may be understood as a method wherein merely more frequency carriers are additionally assigned. Therefore, an efficient method for transmitting and receiving signals that enables high-performance processing, and, more particularly, a method for transmitting and receiving control information, which newly or additionally assigned a carrier to the user equipment, or which manages the assigned carriers is required to be defined more specifically.

DETAILED DESCRIPTION OF THE INVENTION

Technical Objects

An object of the present invention is to provide an efficient communication system and an efficient communication method.

Another object of the present invention is to provide an efficient method for transmitting and receiving control information in a multi-band based communication environment.

A further object of the present invention is to provide an efficient method for dynamically or semi-statically assigning available carriers to a user equipment via lower layer signaling in a multi-band based communication environment.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the technical objects of the present invention, the present invention discloses efficient methods for transmitting and receiving control information is a wireless communication system using multi carriers.

According to an aspect of the present invention, a method for assigning a carrier from a base station to a user equipment in a wideband radio access system supporting multiple carriers includes the steps of transmitting user equipment (UE)-specific or user equipment (UE)-group-specific carrier assignment information to the user equipment, wherein the UE-specific or UE-group-specific carrier assignment information includes information on at least one available candidate carrier, the candidate carrier enabling the user equipment to transmit and receive at least one of control information and data, and transmitting carrier aggregation control information to the user equipment, wherein the carrier aggregation control information includes configuration or status change information of the at least one available candidate carrier.

At this point, it may be preferable to transmit the carrier assignment information to the user equipment by using higher layer control signaling, to transmit the carrier aggregation control information to the user equipment by using lower layer control signaling.

Also, it may be preferable to semi-statically transmit the carrier assignment information to the user equipment, and to dynamically transmit, or to transmit as required, the carrier aggregation control information to the user equipment at a predetermined cycle period by using an event-triggering method.

Also, the carrier aggregation control information may include at least one of information on at least one new carrier, the new carrier being added to or excluded from the at least one available candidate carrier, information indicating whether or not at least a portion of the at least one available candidate carrier is activated, and information on a link change of the at least one available candidate carrier.

Also, all of at least one user equipment-specific carrier, within a user equipment, a user equipment group, or a base station region, may be configured without requesting any separate carrier assignment information, and by using such carrier, configuration information on available candidate carriers and/or carrier status change information and/or link change information may be transmitted as the carrier aggregation control information.

Also, the carrier assignment method may include receiving feedback information from the user equipment, wherein the feedback information indicates whether or not an error occurs during a reception of the carrier aggregation control information.

Furthermore, it may be preferable that the step of transmitting the carrier assignment information is performed after establishing a radio resource control connection between the user equipment and the base station.

In another aspect of the present invention, a method for receiving a carrier assignment in a user equipment from a base station in a wideband radio access system supporting multiple carriers includes the steps of receiving user equipment (UE)-specific or user equipment (UE)-group-specific carrier assignment information from the base station, wherein the UE-specific or UE-group-specific carrier assignment information includes information on at least one available candidate carrier, the candidate carrier enabling the user equipment to transmit and receive at least one of control information and data, and receiving carrier aggregation control information from the base station, wherein the carrier aggregation control information includes configuration or status change information of the at least one available candidate carrier.

At this point, it may be preferable that the carrier assignment information is received by using higher layer control signaling, and that the carrier aggregation control information is received by using lower layer control signaling.

Also, it may be preferable that the carrier assignment information is semi-statically received, and that the carrier aggregation control information is dynamically received, or received as required, at a predetermined cycle period by using an event-triggering method.

Also, it may be preferable that the carrier aggregation control information includes at least one of information on at least one new carrier, the new carrier being added to or excluded from the at least one available candidate carrier, information indicating whether or not at least a portion of the at least one available candidate carrier is activated, and information on a link change of the at least one available candidate carrier.

Additionally, the carrier assignment method may further include transmitting feedback information to the base station, wherein the feedback information indicates whether or not an error occurs during a reception of the carrier aggregation control information.

Furthermore, the user equipment may operate in accordance with the carrier aggregation control information, after a predetermined number of sub-frames, starting from a point where the carrier aggregation control information is received.

In yet another aspect of the present invention, a mobile user equipment operating in a wideband radio access system supporting multiple carriers may include a processor, and a radio communication module configured to receive a radio signal from an external source, to perform demodulation and decoding on the received radio signal, and to deliver the processed signal to the processor, and configured to perform modulation and encoding on data being delivered from the processor and to transmit the processed data to an external target. Herein, the processor may receive user equipment (UE)-specific or user equipment (UE)-group-specific carrier assignment information from a base station, so as to acquire information on at least one available candidate carrier, which is used for transmitting and receiving at least one of control information and data, and the processor may receive carrier aggregation control information from the base station, so as to decide an available carrier based upon configuration or status change information of the at least one available candidate carrier included in the received carrier aggregation control information, thereby enabling the mobile user equipment to communicate with the base station.

At this point, it may be preferable to receive the carrier assignment information by using higher layer control signaling, and it may be preferable to receive the carrier aggregation control information by using lower layer control signaling.

Also, the carrier assignment information may be semi-statically received, and the carrier aggregation control information may be dynamically received, or received as required, at a predetermined cycle period by using an event-triggering method.

Also, the carrier aggregation control information may include at least one of information on at least one new carrier, the new carrier being added to or excluded from the at least one available candidate carrier, information indicating whether or not at least a portion of the at least one available candidate carrier is activated, and information on a link change of the at least one available candidate carrier.

And, the processor may determine whether or not an error occurs when receiving the carrier aggregation control information, and the processor may control the radio communication module so that feedback information indicating the determined reception error status when receiving the carrier aggregation control information can be transmitted to the base station.

Furthermore, the processor may decide the available carrier based upon the carrier aggregation control information, after a predetermined number of sub-frames, starting from a time point when the carrier aggregation control information is received.

Effects of the Invention

According to the exemplary embodiments of the present invention, the present invention has the following effects.

First of all, by using the exemplary embodiments of the present invention, efficient communication may be performed.

Secondly, in a multi-carrier environment, diverse control information of an LTE system may be effectively transmitted and received.

Thirdly, since available carriers of a user equipment are semi-statically and/or dynamically assigned, whenever required, by using a lower-layer signaling method according to the present invention, radio resources may be efficiently managed.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS (a) and (b) of FIG. 1 illustrate a method for transmitting and receiving multiple bandwidth radio frequency (RF) based signals.

BEST MODE FOR CARRYING OUT THE PRESENT INVENTION

Figure 1:
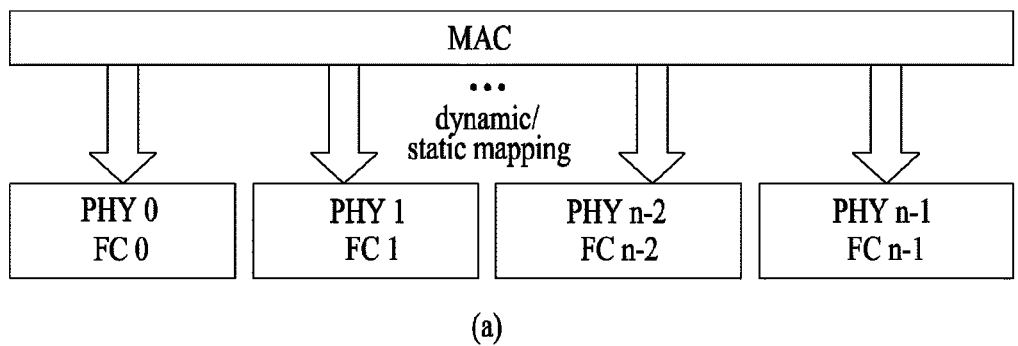
Figure 1:
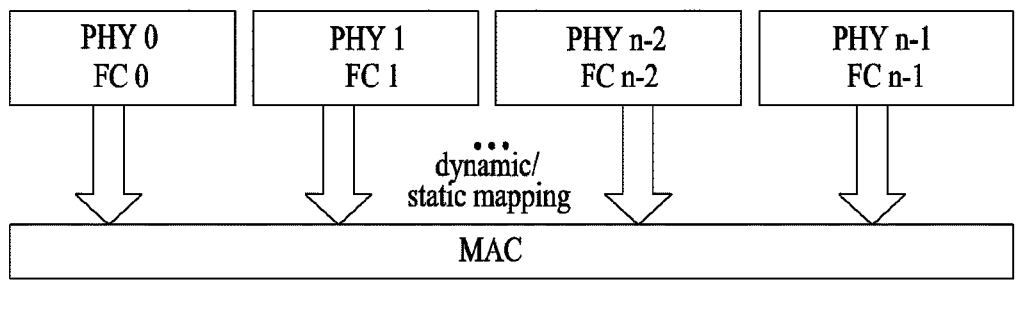
Figure 2:
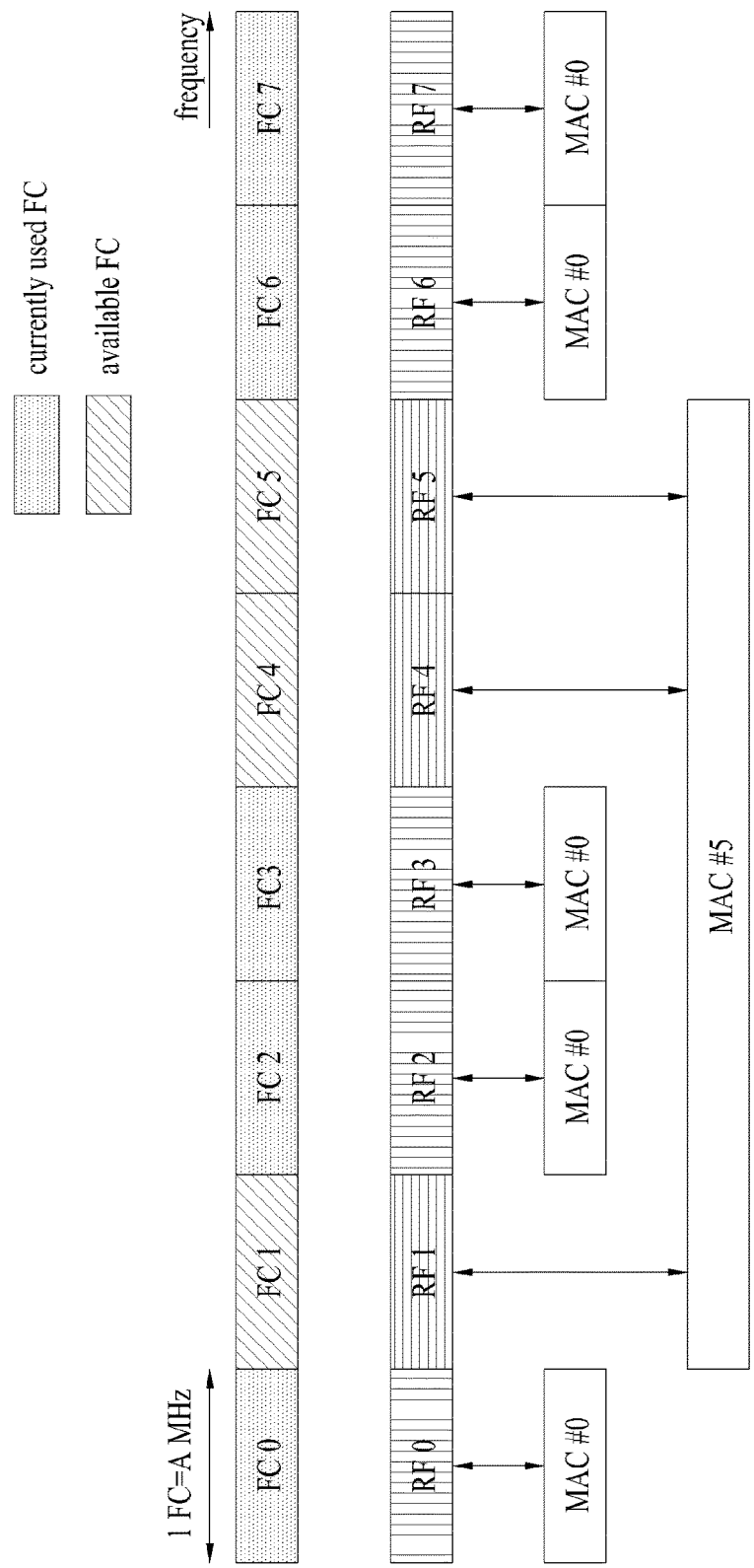
FIG. 2 illustrates an exemplary method for allocating a frequency in a multi-carrier system.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP LTE system. However, with the exception for the unique features of the 3GPP LTE system, other mobile communication systems may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it will be assumed that the term user equipment is used to collectively refer to a mobile or fixed user-end device, such as a UE (User Equipment), an MS (Mobile Station), and so on. Additionally, it will also be assumed that the term base station is used to collectively refer to a random node of a network end communicating with the user equipment, such as Node B, eNode B, Base Station, and so on.

In the exemplary embodiments of the present invention, the medium access control layer may be used as a term collectively referring to a layer having a higher concept than that of the PHY (Physical layer or layer 1) in an OSI 7 layer. Additionally, in the drawings, which are appended to describe the exemplary embodiments of the present invention, the frequency carriers are illustrated to be contiguous to one another. However, as described above, the frequency carriers may not be physically contiguous to one another.

The wireless environment considered in the present invention includes all environments for the general multi-carrier support. More specifically, in the present invention, a multi-carrier system or a carrier aggregation system refers to a system that aggregates one or more carriers, each having a bandwidth smaller than the targeted band, when a wideband is targeted in order to support wideband. When aggregating at least one or more carriers each having a bandwidth smaller than the targeted band, the bandwidth of the aggregated carriers may be limited to a bandwidth that is used in a conventional system in order to satisfy backward compatibility with the conventional IMT system. For example, the conventional 3GPP LTE system supports the bandwidths of {1.4, 3, 5, 10, 15, 20} MHz, and, in the LTE_A system, only the above-mentioned bandwidths, which are supported by LTE, are aggregated so that the LTE-A system can support a bandwidth larger than 20 MHz. Furthermore, regardless of the bandwidth used in the conventional system, a new bandwidth may be defined so that the newly defined bandwidth can support carrier aggregation.

Also, in the present invention, carrier aggregation corresponds to a concept including contiguous carrier aggregation, wherein only the contiguous carriers are aggregated, and non-contiguous carrier aggregation or spectrum aggregation, wherein non-contiguous carriers may also be aggregated. Furthermore, the term bandwidth aggregation (BW aggregation) may be alternately used with the term carrier aggregation.

The method for transmitting and receiving control information according to the present invention assumes a situation after a radio resource control (RRC) connection is established between the user equipment and the base station via initial access. Accordingly, a method for processing a random access procedure, which can be applied to the exemplary embodiments of the present invention, will first be described in detail.

Method for Processing a Random Access Procedure

Figure 3:
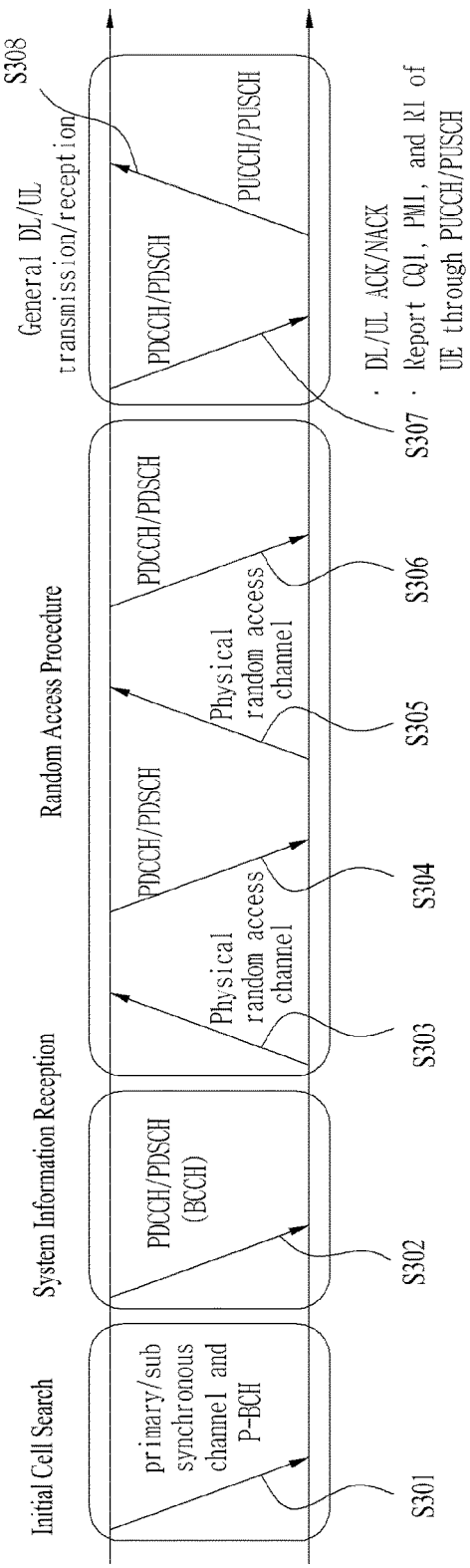
FIG. 3 illustrates a method for transmitting physical channels used in a 3GPP (3rd Generation Partnership Project) LTE (Long Term Evolution) system and a method for transmitting general signals by using such physical channels.

FIG. 3 illustrates a method for transmitting physical channels used in a 3GPP (3rd Generation Partnership Project) LTE (Long Term Evolution) system and a method for transmitting general signals by using such physical channels.

In step S301, the user equipment performs initial cell search such as synchronization with the base station, when it newly enters a cell or when the power is turned on. In order to do so, the user equipment synchronizes with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, in step S302, the corresponding user equipment may acquire more detailed system information by receiving a Physical Downlink Shared Channel (PDSCH) based upon the Physical Downlink Control Channel (PDCCH) and the Physical Downlink Control Channel information.

Meanwhile, if the user equipment initially accesses the base station, or if there are no radio resources for signal transmission, the user equipment may perform a Random Access Procedure (RACH), as shown in step S303 to step S306, with respect to the base station. In order to do so, the user equipment may transmit a specific sequence to a preamble through a Physical Random Access Channel (PRACH) (S303), and may receive a response message respective to the random access through the PDCCH and the PDSCH corresponding to the PDCCH (S304). In case of a contention based random access, excluding the case of a handover, a Contention Resolution Procedure may be additionally performed afterwards, such as an additional transmission of a physical random access channel (S305) and reception (S306).

After performing the above-described process steps, the user equipment may perform PDCCH/PDSCH reception (S307) and Physical Uplink Shared Channel (PUSCH)/Physical Uplink Control Channel (PUCCH) transmission (S303), as general uplink/downlink signal transmission procedures. Meanwhile, the control information, which is transmitted by the user equipment to the base station or received by the user equipment from the base station via uplink, includes downlink/uplink ACK/NACK signals, CQI (Channel Quality Indicator)/PMI (Precoding Matrix Index)/RI (Rank Indicator), and so on. In case of the 3GPP LTE system, the user equipment may transmit control information, such as the above-described CQI/PMI/RI through the PUSCH and/or the PUCCH.

Based upon the above-mentioned description, a Random Access procedure provided by the LTE system will hereinafter be briefly described.

First of all, the user equipment performs the Random Access procedure in the cases listed below:

when a Radio Resource Control (RRC Connection) between the user equipment and the base station does not exist, and, therefore, when the user equipment performs initial access when the user equipment first accesses a target cell, during a handover process when a random access procedure is requested by a command made by the base station when data that are to be transmitted via uplink occur, in a situation wherein time synchronization of the uplink does not match, or wherein a designated radio resource, which is used for requesting radio resource, does not exist when a recovery process is performed during a radio link failure or a handover failure.

During a process of selecting a random access preamble, the LTE system provides both contention based random access procedure, wherein the user equipment randomly selects a single preamble from a specific group and uses the selected preamble, and non-contention based random access procedure, wherein a specific user equipment uses a random access preamble, which is assigned only to the specific user equipment by the base station. Herein, however, the usage of the non-contention based random access procedure may be limited only during the above-described handover process, or when requested by a command made by the base station.

Meanwhile, a process during which the user equipment performs a random access with a specific base station may broadly include (1) a step of having the user equipment transmit a random access preamble to the base station (if there is no confusion, hereinafter referred to as a step of transmitting "message 1"), (2) a step of receiving a random access response from the base station with respect to the transmitted random access preamble (if there is no confusion, hereinafter referred to as a step of receiving "message 2"), (3) a step of transmitting an uplink message by using information received from the random access response message (if there is no confusion, hereinafter referred to as a step of transmitting "message 3"), and (4) a step of receiving a message respective to the uplink message from the base station (if there is no confusion, hereinafter referred to as a step of receiving "message 4").

When considering the multi-carrier environment, it may be difficult to directly apply the random access procedure, which is described above with reference to FIG. 3, without any modification. Therefore, an initial access method based upon the multi-carrier environment in more detail will hereinafter be described.

An assumption made prior to performing the random access method in the multi-carrier environment will first be described.

Figure 4:
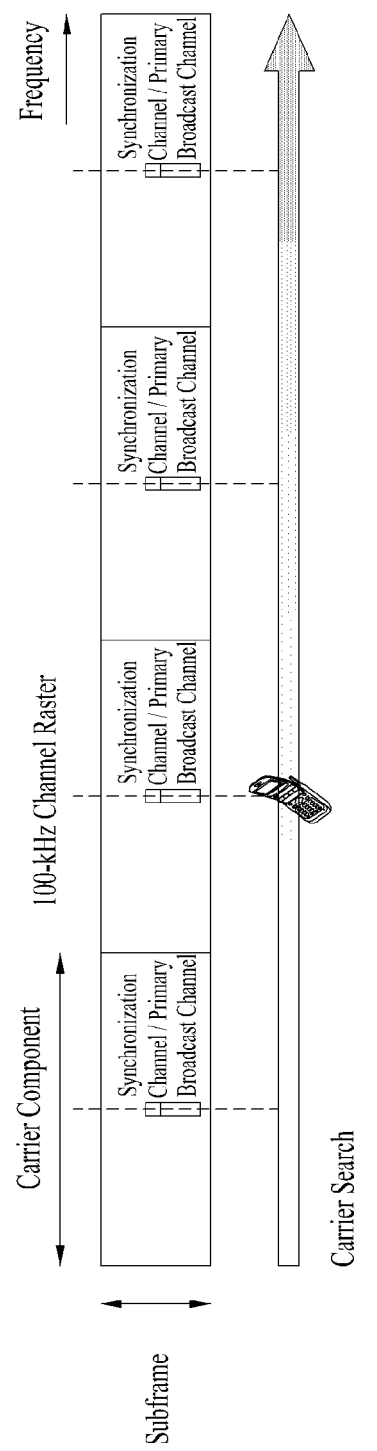
FIG. 4 illustrates a format according to which a synchronization channel and a primary broadcast channel are transmitted for each carrier that can be applied to the exemplary embodiments of the present invention.

FIG. 4 illustrates a format according to which a synchronization channel and a primary broadcast channel are transmitted for each carrier that can be applied to the exemplary embodiments of the present invention.

The initial access method proposed in the exemplary embodiments of the present invention will hereinafter be described under the assumption that a synchronization channel signal and a primary broadcast channel (PBCH) exist in all downlink (DL) component carriers, as shown in FIG. 4.

Also, in this exemplary embodiment of the present invention, it will be essentially assumed that a physical cell identifier (PCI), which is known through the synchronization channel, and which is being transmitted from each downlink component carrier, is identical for all multi-carriers within a single cell.

Hereinafter, an example of a random access method in the multi-carrier environment according to the present invention will now be described in detail.

During an Initial cell search process, the user equipment attempts to perform a synchronization channel signal search in frequency raster units.

When the user equipment successfully performs the synchronization channel signal search from any one of the aggregated downlink carriers, the corresponding carrier may be determined as a downlink (DL) reference carrier. During this process, the physical cell identifier is received. Even if the corresponding carrier is not separately set up as the reference carrier, the downlink carrier from which the synchronization channel signal is searched will hereinafter be referred to as the reference carrier for simplicity.

The primary broadcast channel is received from the reference carrier so that information such as a downlink transmission bandwidth, a Physical Hybrid ARQ Indicator Channel (PHICH), a system frame number (SFN), a number of transmission antennae in a base station, and so on.

In order to receive information required for performing the initial access, the user equipment receives system information (SI-x), which is transmitted to the reference carrier. Herein, an uplink bandwidth, an uplink E-UTRA absolute radio frequency channel number (UL EARFCN), higher-layer signaling associated with diverse uplink/downlink channel settings, and so on, may be transmitted to the system information. More specifically, when the absolute radio frequency channel number and bandwidth of the uplink carrier is known after receiving the system information, information on an uplink-downlink pair band is received from the frequency division multiplexing process.

The user equipment may set up the uplink carrier, from which the above-described information is received by using the above-described method, as the uplink reference carrier. As described above, in the description of the present invention, even if a reference carrier is not separately set up in the uplink, the uplink carrier, which is linked to the downlink carrier from which the synchronization channel signal is searched, will hereinafter be referred to as the reference carrier for simplicity.

The base station transmits cell-specific multi-carrier set-up information through the downlink reference carrier, so as to notify the user equipment that the carrier settings have been made in the corresponding cell. During this process, the same physical cell identifier may be transmitted, or different physical cell identifiers may be transmitted for each carrier, through the synchronization signal of the aggregated multiple downlink carriers within a single cell. When the user equipment is informed of the carrier set-up information of the corresponding cell, the carrier may be changed by performing a simple handover process.

The cell-specific multi-carrier set-up information may be transmitted through extended system information (extended SI-x), which is designated to user equipments of the LTE-A standard, or the cell-specific multi-carrier set-up information may be transmitted to the user equipment through a reserved portion of the primary broadcast channel (PBCH) regulated by the general LTE standard (LTE Rel. 8). As another transmission method, the cell-specific multi-carrier set-up information may be included in the broadcast information, the system information, or the absolute radio frequency channel number of the corresponding cell.

Such cell-specific multi-carrier set-up information may include information indicating a downlink carrier among the multi-carriers included in the corresponding cell, carrier frequency information, downlink/uplink carrier link information of the corresponding cell, and so on.

If the physical cell identifier values for each of the multiple downlink carriers within the same cell are equal to one another, downlink carrier information within the cell, which is received (or acquired) from the cell-specific multi-carrier set-up information, may be used. Therefore, the user equipment may not be required to receive the primary broadcast channel, system information, and synchronization channel of another downlink carrier.

Conversely, the physical cell identifier values for each of the multiple downlink carriers within the same cell are different from one another, the user equipment uses the downlink carrier information received (or acquired) from the cell-specific multi-carrier set-up information, so as to perform a synchronization channel search process in each of the downlink carriers, thereby receiving the physical cell identifiers for each carrier. The user equipment may use the received physical cell identifier when performing reference signal sequence generation, scrambling, and so on, for each carrier. Thereafter, the user equipment receives the primary broadcast channel and system information, and the user equipment may then be capable of knowing information on the uplink carriers, which are connected (or linked) to each downlink carrier.

When link information of the downlink/uplink carriers within the corresponding cell is separately transmitted, the user equipment may be informed of the link information without receiving the system information.

Subsequently, the user equipment uses the physical random access channel parameter, which is transmitted through the reference downlink carrier, so as to transmit a random access preamble (i.e., message 1) to the base station through the physical random access channel of the reference uplink carrier. When the base station receives the random access preamble, the base station transmits a random access channel response (message 2) through the downlink reference carrier.

At this point, the random access channel response, which is transmitted from the base station to the user equipment, may be transmitted from the base station by broadly using two different methods, which will be described below.

A first method for transmitting a random access channel response corresponds to a method of transmitting the random access channel response through all downlink component carriers that are linked to the uplink carrier, to which the random access preamble is transmitted. A second method for transmitting a random access channel response corresponds to a method of transmitting the random access channel response through only one of the downlink component carriers that are linked to the uplink carrier, to which the random access preamble is transmitted.

With the exception for the portion related to the multi-carriers, the other message 1 to message 3 are similar to those described with reference to FIG. 3. Therefore, the detailed description of the same will be omitted for simplicity of the description of the present invention.

The detailed description of the random access methods in a multi-carrier environment that can be applied to the exemplary embodiments of the present invention are as described above. However, the above-described random access methods are merely exemplary. And, therefore, it will be assumed that the exemplary embodiments of the present invention are applied, after the RRC connection between the user equipment and the base station is established, in a multi-carrier environment, regardless of the detailed configuration of the random access procedure.

Transmission of Control Information Related to Carrier Assignment

Hereinafter, a method for assigning carriers as control information that may be transmitted from the base station to the user equipment, after a radio resource control (RRC) connection is established, according to an exemplary embodiment of the present invention will be described in detail.

When the user equipment transmits message 3 to the base station, the user equipment and the base station may perform an agreement procedure in accordance with the performance (or ability) of the user equipment. Accordingly, the base station may allocate user equipment (UE)-specific carrier assignment information or UE-group-specific carrier assignment information or UE-specific carrier assignment information within a base station region (or cell-specific carrier assignment information) to the user equipment (UE).

Hereinafter, UE-specific or UE-group-specific or cell-specific carrier assignment information will be collectively referred to as 'UE-specific carrier assignment', and, herein, 'UE-specific carrier assignment information' may include information on an available candidate carrier enabling a specific user equipment to transmit/receive control information/data from a cell. A downlink or uplink available candidate carrier or an activated carrier among the available candidate carriers may refer to an object carrier, wherein data scheduling through the corresponding carrier may be realized at any time point, and wherein scheduling control information of the user equipment respective to the above-mentioned data scheduling may be monitored.

Even though carrier settings of a cell are set-up to be symmetrical (i.e., when a number of uplink component carriers is equal to a number of downlink component carriers), when downlink-uplink (DL-UL) linkage information of the system is required to be ignored (overridden), in order to support user equipments using asymmetrical carrier aggregation within the corresponding cell, such UE-specific carrier assignment information may correspond to a method for performing such functions. This will be described in more detail with reference to FIG. 5.

Figure 5:
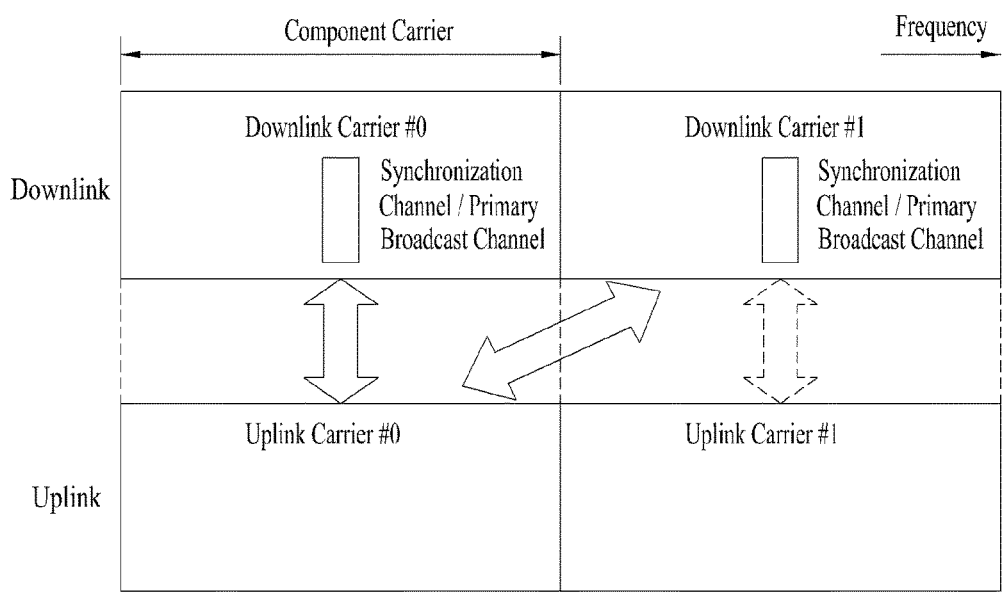
FIG. 5 illustrates a method of determining a carrier for a specific user equipment regardless of the carrier settings of a cell, by using user equipment specific carrier assignment information according to an exemplary embodiment of the present invention.

FIG. 5 illustrates a method of determining a carrier for a specific user equipment regardless of the carrier settings of a cell, by using UE-specific carrier assignment information according to an exemplary embodiment of the present invention.

The UE-specific carrier assignment information may be transmitted only with respect to a user equipment or a user equipment group that should override the downlink-uplink linkage information of the system, or the UE-specific carrier assignment information may be transmitted to all user equipments using carrier aggregation. As shown in FIG. 5, 2 downlink component carriers and 2 uplink component carriers exist as the available candidate carriers, and, the carriers are aggregated in a symmetrical multi carrier aggregation, by performing an override, the symmetrical multi carrier aggregation format is modified to an asymmetrical multi carrier aggregation, wherein two downlink component carriers are connected to a single uplink component carrier #0.

In the above-described case, the user equipment performs blind decoding on a physical downlink control channel (PDCCH) from a candidate downlink component carrier, which may be used by the corresponding user equipment. Accordingly, if a physical downlink control channel is not detected, the user equipment may not receive the data respective to the corresponding carrier within the corresponding sub-frame.

Hereinafter, an exemplary carrier assignment method according to the present invention will be briefly described with reference to FIG. 6.

Figure 6:
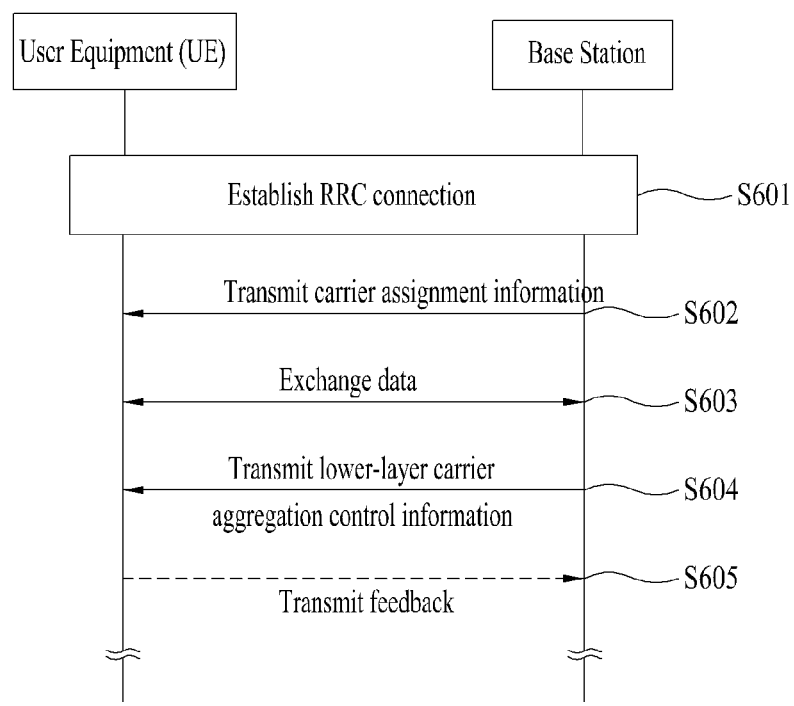
FIG. 6 illustrates an exemplary process, wherein the base station assigns a carrier to the user equipment and controls the assigned carrier according to an exemplary embodiment of the present invention.

FIG. 6 illustrates an exemplary process, wherein the base station assigns a carrier to the user equipment and controls the assigned carrier according to an exemplary embodiment of the present invention.

Referring to FIG. 6, by performing the above-described random access procedure, a radio resource control (RRC) connection between the user equipment and the base station may be established (S601).

Accordingly, the base station may transmit UE-specific or UE-group-specific carrier assignment information (S602).

At this point, it is preferable that the format according to which the carrier assignment information is delivered corresponds to higher-layer control signaling, e.g., radio resource control signaling. Since the format of carrier set-up information and information included in the carrier set-up information are identical to those described above, description for the like parts will be omitted for simplicity, and detailed description of the above-mentioned information will hereinafter be additionally provided.

The user equipment is assigned with one or more uplink/downlink carriers based upon the carrier assignment information from the base station, and, then, by using the assigned carriers, data exchange may be performed between the user equipment and the base station may be performed (S603).

Thereafter, based upon a predetermined cycle period, or whenever required, the base station may semi-dynamically transmit lower-layer carrier aggregation control information to the user equipment by using an event trigger method (S604).

Herein, the lower-layer carrier aggregation control information may refer to information enabling carrier assignment information, which is semi-statically transmitted to the user equipment, to be overridden, or may refer to information notifying a specific user equipment or a specific user equipment group of the carrier aggregation situation. This will also be described in more detail in the following description.

Furthermore, a step of setting-up at least one or more UE-specific or UE-group-specific or cell-specific carriers without requesting a separate set of carrier assignment information, and a step of transmitting set-up information on an available candidate carrier and/or carrier status change information and/or link change information through the at least one or more carriers that are set-up, as described above, as the carrier aggregation control information may also be included herein.

Based upon whether or not an error occurs during a reception of lower-layer carrier aggregation control information in the base station, the user equipment may optionally transmit feedback information indicating whether or not a reception error occurs to the base station.

In the carrier assignment process that is briefly described above with reference to FIG. 6, step S602 and step S604 may be semi-statically, dynamically, or semi-dynamically performed multiple times as required. Hereinafter, the carrier assignment information of step S602, the lower-layer carrier aggregation control information of step S604, and the feedback of S605 will be described in more detail.

The carrier assignment information will first be described in detail.

Transmission Format of Carrier Assignment Information

When the based station according to an exemplary embodiment of the present invention transmits the above-described UE-specific carrier assignment information to the user equipment (UE), the UE-specific carrier assignment information may be used in the following formats.

Since the UE-specific carrier assignment information essentially corresponds to information that is not required to be dynamically modified, the base station may notify the user equipment of the UE-specific carrier assignment information via UE-specific or cell-specific radio resource control (RRC) signaling, or the base station may transmit the UE-specific carrier assignment information to the user equipment by using a separate channel at a specific cycle period.

Based upon an operational aspect, such as a traffic situation of the user equipment or an overall traffic situation within a cell, an available carrier of a user equipment may be required to be dynamically limited or extended. In order to support such situations:

1) the base station is required to prevent the user equipment from monitoring the control channel (PDCCH) respective to all downlink candidate (available) carriers that are assigned to the corresponding base station by using the UE-specific carrier assignment information. Therefore, the base station may use a first layer/second layer control signaling (e.g., physical downlink control channel) so as to UE-specifically provide information on the downlink component carrier through which the corresponding user equipment intends to monitor the control channel.

More specifically, the base station may transmit at least one or more of the multiple component carriers, which are supported by the corresponding base station, as one or more available component carriers of the user equipment via radio resource control signaling. Thereafter, as required, the base station may dynamically control usage status or activation status (e.g., on/off, awake/sleep, or activation/deactivation) of each of the one or more component carriers assigned to the user equipment through the first layer/second layer control signaling.

2) As another object, in order to dynamically allocate a larger number of component carriers respective to available downlink or uplink component carriers of the user equipment, which is set-up via UE-specific radio resource control signaling, i.e., a number of component carriers within the range of available carriers assigned via radio resource signaling or a number of component carrier within other ranges, the base station may UE-specifically, perform first layer/second layer control signaling.

For example, the base station may semi-statically allocate only one carrier respective to each of an uplink and a downlink via radio resource control signaling to the user equipment, or the base station may designate a carrier, which is accessed by an initial access procedure, as a connection set-up carrier, and, whenever and as required (event-triggered), the base station may dynamically allocate additional carriers to the user equipment via first layer/second layer control signaling, or the base station may retrieve the assigned carriers.

It will be understood that the above-described radio resource control signaling and the first layer/second layer control signaling will be commonly applied to the exemplary embodiments of the present invention that will hereinafter be described in detail.

Meanwhile, the base station may prevent information, which is included in the first layer/second layer control signaling, from including valid timing offset information in the corresponding control signaling and from being transmitted for each sub-frame. Accordingly, the downlink physical resource may be saved (or reserved).

In conclusion, the UE-specific carrier assignment information may be semi-statically or dynamically (semi-dynamically) transmitted via UE-specific radio resource control (RRC) signaling at a predetermined cycle period (cycle period≥1TTI), or may be transmitted by using an event-triggered method. Herein, a method of transmitting the UE-specific carrier assignment information to the user equipment by using both of the above-described transmission methods may also be included.

As a detailed example of a method for transmitting control information related to carrier assignment according to the present invention, the basic UE-specific carrier assignment information uses UE-specific RRC signaling, and lower layer (L1/L2) control signaling may be used with respect to change in the UE-specific carrier assignment that occurs non-specifically. Herein, an example of the change in the UE-specific carrier assignment that occurs non-specifically may include an on/off status (status indicating whether or not control channel monitoring of the user equipment is performed) on at least one of the uplink/downlink component carriers assigned to the user equipment. Such lower layer control signaling may be dynamically or semi-dynamically transmitted at a predetermined cycle period (cycle period≥1TTI), or may be transmitted by using an event-triggered method.

Meanwhile, in order to notify the user equipment of the UE-specific carrier assignment information, the base station may use the following methods.

1) The user equipment essentially follows the carrier aggregation configuration of a cell. However, when a change is required to be made, a method of transmitting only the information, which is configured to override the carrier aggregation configuration of a cell, may be used. For example, although the carrier aggregation configuration of a cell is symmetrical, in case of a specific LTE-A user equipment, an asymmetrical carrier aggregation capability may be used. In this case, the base station may transmit link information to the user equipment, wherein the link information may override the carrier configuration of the corresponding cell (linkage information of a DL-UL carrier, which is received through the system information within the corresponding cell).

2) The base station may transmit information, such as downlink (DL) carrier index or extended downlink E-UTRAN absolute radio frequency channel number (extended DL EARFCN), to the user equipment, thereby transmitting only information on a downlink carrier frequency number. In this case, the user equipment may be capable of receiving uplink (UL) linkage information through system information (SI-x) of the corresponding carrier. In other words, when the base station first notifies an index or frequency number of a downlink carrier to the user equipment, the user equipment may be informed of the information on the uplink carrier, which is connected to the corresponding downlink carrier, through the system information.

3) Herein, a method wherein the base station provides the user equipment with uplink (UL) linkage information, which is connected to the corresponding downlink carrier, along with the assigned downlink carrier information.

Lower Layer Carrier Aggregation Control Information

As described above, the base station may dynamically control the carrier, which the base station semi-statically assigned to the user equipment, by using higher layer signaling (e.g., radio resource control signaling), or the base station may use lower layer carrier aggregation control information (e.g., L1/L2 control signaling) in order to override the uplink/downlink carrier configuration information of a cell. In other words, the lower layer carrier aggregation control information according to the present invention refers to information that enables the base station to override the UE-specific carrier assignment information, which is semi-statically transmitted to the user equipment, or refers to information that notifies a carrier aggregation situation to a specific user equipment or user equipment group.

In the description of the present invention, such lower layer carrier aggregation control information will hereinafter be referred to as first layer carrier aggregation control information (or L1 CA) for simplicity. Herein, the L1 CA control information may be transmitted from the base station to the user equipment at a predetermined cycle period, and when required, the L1 CA control information may also be dynamically transmitted to the user equipment by using the event-triggered method.

The L1 CA control information will now be described in detail.

When the L1 CA control information is used as information notifying the above-described carrier aggregation situation, and when UE-specific or UE-group-specific carrier assignment is configured by using the conventional UE-specific radio resource control signaling method, the carrier aggregation situation may correspond to a change in information on an increase or decrease in a number of carriers and/or a change in activation/deactivation status information of a configured carrier or all available carriers and/or a change in carrier index information in an increased or decreased situation and/or a change in uplink/downlink carrier connection information associated to the carrier index information. In this case, the significance of the number of carriers may correspond to information on candidate carrier configuration, through which the user equipment may receive a data shared channel (SCH), and the significance of the number of carriers may also correspond to information on a direct configuration of a carrier, through which the data shared channel can be transmitted.

As an exemplary format of the candidate carrier configuration, information on a number of carriers and/or a carrier index and/or associated linkage information may correspond to information indicating a carrier situation in which the user equipment is required to perform a minimum blind decoding process on the physical downlink control channel. Conversely, such information may also correspond to information indicating a candidate carrier situation in which the user equipment is required to perform a maximum blind decoding process on the physical downlink control channel.

Meanwhile, when the L1 CA control information directly indicates a carrier through which an uplink/downlink data shared channel is transmitted/received, and, as an uplink/downlink control information corresponding to the L1 CA control information, a carrier indicator indicating a carrier through which the corresponding physical downlink shared channel or physical uplink shared channel is transmitted, may be additionally included, thereby being signaled in the form of a physical downlink control channel. More specifically, the L1 CA control information may be transmitted over a physical downlink control channel downlink control information format respective to the corresponding physical downlink shared channel or physical uplink shared channel along with the downlink channel allocation control information.

At this point, a number of bits used in an L1 CA control information field, which corresponds to the carrier indicator, may be defined as a number of bits having the value of $$\lceil \log_2 Z \rceil$$

based upon a number of available carriers "Z" that are semi-statically assigned, wherein this information corresponds to UE-specific carrier configuration information. In another method for defining the number of bits, the number of bits may be defined by using the above-described method for calculating the number of bits, based upon a number of all available uplink/downlink component carriers, or based upon a number of cases using a randomly limited number of component carrier aggregations. In yet another method, the number of bits may be defined as a fixed number of bits configured to indicate an indication information format respective to whether or not a physical downlink shared channel within a carrier is transmitted, the carrier being identical to the downlink component carrier through which the corresponding physical downlink control channel is transmitted, or whether or not a physical uplink shared channel within an uplink component carrier, which is connected to the transmission status of the physical downlink shared channel. Additionally, when required, link configuration information between carriers, through which data are transmitted (e.g., link information between uplink and downlink carriers), may be signaled along with the number of bits.

The above-described configuration and attributes of the L1 CA control information may be identically applied when realizing carrier configuration by using the UE-specific radio resource control signaling.

Application Point of L1 CA Control Information

When transmitting the L1 CA control information to the user equipment from a random sub-frame, and in case a separate verification (or confirmation) procedure (e.g., feedback) is not required, the user equipment or cell/base station may apply the corresponding carrier aggregation status starting from a downlink or uplink sub-frame after p (p≥0) number of sub-frames from the corresponding sub-frame. When a predetermined verification procedure is required to be performed, the corresponding carrier aggregation status may be applied starting from a downlink or uplink sub-frame after q (q≥0) number of sub-frames immediately after the point when the user equipment or cell/base station has transmitted a verification message respective to a successful L1 CA control information reception.

As described above in the description of the present invention, the L1 CA control information may correspond to information indicating a UE-specific carrier aggregation status. However, the L1 CA control information may also correspond to information indicating UE-group-specific, cell-specific, base station-specific, cluster-specific, or system-specific carrier aggregation status.

Transmission Cycle Period of L1 CA Control Information for Dynamic Carrier Management 1) Dynamic Transmission The L1 CA control information may be transmitted for each sub-frame. And, in this case, even if a verification procedure (such as ACK response/NACK response) on the L1 CA control information is not required or performed, a level of influence caused by the error propagation is extremely low. More specifically, in a random sub-frame, even if an error occurs during the reception of the L1 CA control information, since a new set of L1 CA control information is transmitted in the next sub-frame, the error respective to the L1 CA control information may be limited to the corresponding sub-frame.

2) Semi-Dynamic Transmission

A method of transmitting the L1 CA control information at a cycle period of more than 1 sub-frame and using previously transmitted L1 CA control information during the corresponding cycle period may be applied herein. In this case, since the L1 CA control information is not transmitted for each sub-frame, a waste in resource (overhead) may be reduced. However, once the L1 CA control information is broken, the respective error may influence the sub-frame for as long as the transmission cycle period.

At this point, when the L1 CA control information is semi-statically transmitted, in order to verify whether or not an error occurs during the reception of the L1 CA control information, the user equipment may transmit an ACK/NACK corresponding to whether or not a reception error occurs during the reception of the L1 CA control information. In order to do so, the user equipment receiving the L1 CA control information may determine a presence or absence of the reception error with respect to the received L1 CA control information by using a method such as a cyclic redundancy check (CRC) process. Based upon the result for determining the presence or absence of the reception error, if the sub-frame that has received the L1 CA control information corresponds to an $n^{th}$ sub-frame, the user equipment may transmit a feedback to an $n+k^{th}$ (k≥1) sub-frame, wherein the feedback notifies the base station of the presence or absence of the reception error. In the form of a feedback, the user equipment may use a physical uplink control channel format 1 (PUCCH format 1) of LTE Release 8 (LTE Rel. 8). At this point, in order to provide additional error-resistance, the base station may transmit multiple sets of ACK information or ACK/NACK information through one or more uplink sub-frames. And, as another method, the base station may direct (or request) a verification on a reception status to the user equipment. Furthermore, such feedback may also have the format of CRC protection ACK or ACK/NACK.

3) Event-Triggered Transmission

Unlike the above-described cases, as a method that does not configure a separate cycle period, an event-triggering method may be used. More specifically, when it is determined to be required by the system or cell/base station, the L1 CA control information is transmitted as a random time point through one or more sub-frames. At this point, multiple sub-frames may also be used. The purpose of using multiple sub-frames is to performed iterated (or repeated) transmission in order to enhance the reliability of the control information included in the multiple sub-frames. Herein, the multiple sub-frames may correspond to contiguous sub-frames, the multiple sub-frames may correspond to non-contiguous sub-frames. Moreover, in the L1 CA control information transmission performed by a cell/base station, with respect to when the method proposed in the above description is applied, the user equipment receiving the last sub-frame, which transmits the corresponding L1 CA control information, may transmit feedback information, which indicates the presence or absence of an error when receiving the last sub-frame, to the base station.

Meanwhile, there may occur a case when the user equipment is unaware of a sub-frame timing according to which the cell/base station transmits the L1 CA control information. In this case, a method for adequately determining whether or not the L1 CA control information has been transmitted or whether or not an error has occurred during the reception of the transmitted L1 CA control information may be used, and the method will now be described in detail.

A position within a physical/logical resource of a physical channel to which the L1 CA control information is being transmitted may be uniquely configured. More specifically, by using a method of limiting a resource area to which the L1 CA control information is transmitted in advance, and of performing a CRC-masking process by using a specific Cell Radio Network Temporary Identifier (C-RNTI), the L1 CA control information may be UE-specifically transmitted. Accordingly, the user equipment may perform decoding with respect to a candidate resource of a physical channel, to which the L1 CA control information is transmitted, within all of the sub-frames. Based upon the decoded result, when the decoding process is successfully performed, the user equipment transmits an ACK feedback to the cell/base station. And, if the decoding process fails to be performed successfully, instead of transmitting a NACK feedback to the cell/base station, the user equipment does not perform any subsequent operations. Accordingly, by using this method, the user equipment may perform the verification procedure.

At this point, when the sub-frame receiving the L1 CA control information corresponds to the $n^{th}$ sub-frame, the user equipment may transmit feedback information to the $n+k^{th}$ ($k \geq 1$) sub-frame via uplink. In the form of a feedback, the user equipment may use a physical uplink control channel format 1 (PUCCH format 1) of LTE Release 8 (LTE Rel. 8). At this point, in order to provide additional error-resistance, the base station may transmit multiple sets of ACK information or ACK/NACK information through one or more uplink sub-frames. And, as another method, the base station may direct (or request) a verification on a reception status to the user equipment. Furthermore, such feedback may also have the format of CRC protection ACK or ACK/NACK.

Method for Transmitting L1 CA Control Information

Hereinafter, a detailed format of transmitting the L1 CA control information will be described in detail.

Since the L1 CA control information corresponds to information on the management of a carrier, which is to receive control information and/or data, it may be preferable to have the L1 CA control information be transmitted in a physical downlink control channel region. In this case, also, it may be preferable to perform a verification procedure on the transmission of the physical downlink control channel or a physical downlink control channel map by using a first layer (L1) or a CRC-protected feedback.

1) Method for Transmitting L1 CA Control Information by Using a Dedicated Channel First of all, just as the transmission of a Physical Control Format Indicator Channel (PCFICH) of the LTE Release 8 (LTE Rel-8), a method of transmitting the L1 CA control information by using a separate channel other than the physical downlink control channel is proposed herein. In this case, the L1 CA control information may be transmitted by using a format of n number of control channel elements (nCCE: n Control Channel Elements, n>0) after a physical downlink control channel region, which is defined by the LTE standard.

2) Method for Transmitting L1 CA Control Information by Aapplying an LTE Rel-8 Standard Physical Downlink Control Channel Transmission Scheme to a Physical Downlink Control Channel Region This method proposes that the L1 CA control information maintains the format of n number of control channel elements (nCCE) and this method also proposes that the location, to which the L1 CA control information is transmitted, is limited to a location being included in a common search place. In this case, since the size of the common shared place is limited, it may be preferable to additionally apply a method of UE-specifically limiting the search space. More specifically, the transmission location of the L1 CA control information may be limited to specific locations, such as a very first (or beginning) portion of the UE-specific search place or a very last (or end) portion of the UE-specific search place. At this point, as described above, the transmission of the L1 CA control information may be performed in a way that the L1 CA control information transmission does not influence the transmission of the physical downlink control channel of the conventional LTE Rel-8 or LTE Rel. 9 user equipments.

Meanwhile, in the perspective of a carrier, and not in the perspective of a resource area, the L1 CA control information may only be transmitted by a limited $Z(\geq 1)$ number of downlink carriers. For example, the L1 CA control information may only be transmitted through one or more primary carriers being user-equipment (UE)-specifically or UE-group-specifically configured. In another example, L1 CA control information may only be transmitted through one or more cell-specifically, base station-specifically, cluster-specifically, or system-specifically configured primary carriers, or through one or more backward compatible carriers or one or more LTE-A only carriers.

3) Method for Transmitting L1 CA Control Information by Adding the L1 CA Control Information to a Downlink Control Information (DCI) Format Without Creating a Separate Channel This method proposes that the L1 CA control information may be included in a downlink channel assignment (or allocation) DCI format or an uplink (UL) grant DCI format, each format being designed for an LTE-A user equipment. Since this method does not influence the downlink control information format of the LTE user equipment, no error occurs in the backward compatibility. Also, according to this method, the base station may notify the L1 CA control information to the user equipment within a physical downlink control channel (PDCCH) error range. And, even if an error occurs during the reception process of the user equipment, since the physical downlink control channel itself is dynamic, this method may be advantageous in that no large problem occurs in the error propagation.

Meanwhile, in this method also, in the perspective of a carrier, and not in the perspective of a resource area, the L1 CA control information may only be transmitted by a limited $Z(\geq 1)$ number of downlink carriers. For example, the L1 CA control information may only be transmitted through one or more primary carriers being user-equipment (UE)-specifically or UE-group-specifically configured. In another example, L1 CA control information may only be transmitted through one or more cell-specifically, base station-specifically, cluster-specifically, or system-specifically configured primary carriers, or through one or more backward compatible carriers or one or more LTE-A only carriers.

The following description corresponds to a recapitulation of the above-described methods for transmitting the L1 CA control information. With respect to each of the three proposed methods, when the L1 CA control information is transmitted within a physical downlink control channel area as the physical downlink control channel, which is defined to be used for general purposes based upon the LTE or LTE-A standard using a general technique, it is described in the description of the present invention that the L1 CA control information corresponds to information indicating a UE-specific carrier aggregation situation. However, the present invention will not be limited only to this, and the L1 CA control information may also be used as information indicating the user-equipment (UE)-specific, UE-group-specific, cell-specific, base station-specific, cluster-specific, or system-specific carrier aggregation situation.

Also, as described above, the L1 CA control information may correspond to a series of carrier indicator information directly configuring or designating a random component carrier, through which a random physical uplink/downlink shared channel, among multiple uplink/downlink component carriers, which are assigned to the corresponding user equipment by using UE-specific (or UE-group-specific) carrier assignment information. In this case, a physical downlink control channel may be configured by encoding the L1 CA control information according to a separate coding format in a separate L1 CA control information entity unit, within a sub-frame, wherein random L1 CA control information is being transmitted. Alternatively, a physical downlink control channel may also be configured by using a joint coding method, wherein one or more L1 CA control information entities are grouped so as to be encoded.

For example, when the L1 CA control information is UE-specifically defined, and when the L1 CA control information of several user equipments are transmitted within the same sub-frame, the L1 CA control information may be configured individually for each of the user equipments. In order to do so, the L1 CA control information respective to each user equipment may be processed with CRC-masking by using a specific Cell Radio Network Temporary Identifier (C-RNTI), which may be identified in UE units, thereby being transmitted. Alternatively, the L1 CA control information entities of each user equipment may be encoded by using the joint coding method, so as to be transmitted through a single physical downlink control channel. In this case, the joint-coded L1 CA control information may be processed with CRC-masking by using a specific Cell Radio Network Temporary Identifier, instead of a general Cell Radio Network Temporary Identifier.

Alternatively, control information having an attribute different from that of the L1 CA control information (e.g., carrier indicator information) may also be encoded by using the joint coding method, so as to be transmitted through a single physical downlink control channel.

For example, it will be assumed that the L1 CA control information of one or more random user equipments corresponds to carrier indicator information, which designates a carrier through which a physical uplink/downlink shared channel is transmitted, among the UE-specifically or cell-specifically configured uplink/downlink component carriers. Herein, the L1 CA control information may be joint coded with control information of a downlink control information format, which is related to one or more downlink channel allocations, with respect to a downlink data shared channel transmission of the same user equipment or of a different user equipment, or the L1 CA control information may be joint coded with control information of a downlink control information format, which is related to one or more sets of uplink grant information, with respect to an uplink data shared channel transmission of the same user equipment or of a different user equipment.

In this case, joint coding refers to a coding method, wherein a payload format is configured by adding the L1 CA control information (e.g., carrier indicator) to the downlink control information format of downlink channel allocation control information or uplink grant information control information, and then encoding the configured payload format. More specifically, joint coding refers to a coding method, wherein the L1 CA control information is added to a conventional downlink control information format, and wherein the combined format may be defined as the random downlink control information format. At this point, when different types of control information respective to the same user equipment are joint coded, the L1 CA control information may be processed with CRC-masking by using a UE-specific Cell Radio Network Temporary Identifier (C-RNTI). And, when different types of control information respective to different user equipments are joint coded, the L1 CA control information may be processed with CRC-masking by using a random specific Cell Radio Network Temporary Identifier.

In the perspective of transmission timing, when downlink channel allocation information or uplink grant information, respective to a downlink or uplink data shared channel transmission, is joint coded with an L1 CA control information entity, the transmission of a physical uplink/downlink shared channel respective to the corresponding downlink channel allocation information or uplink grant information may be performed at a sub-frame timing defined by a general LTE or LTE-A standard, or at such sub-frame timing after a predetermined sub-frame unit offset.

Meanwhile, referring to the methods for transmitting the L1 CA control information proposed in the description of the present invention, the basic coding method or multiplexing method of the above-described L1 CA control information may also be in a case, wherein the L1 CA control information is transmitted through a separate dedicated physical channel, other than the physical downlink control channel, which is defined for general usage in the general LTE or LTE-A standard, or through a physical downlink shared channel.

Additionally, in the methods for transmitting the L1 CA control information proposed in the description of the present invention, the carrier through which the L1 CA control information is transmitted may correspond to all downlink components carriers supported by a cell/base station, or may correspond to all downlink component carriers being assigned to the user equipment through UE-specific or UE-group-specific carrier assignment information, which is configured by using a conventional UE-specific RRC signaling method. Also, the L1 CA control information may be configured to be transmitted only through one or more UE-specifically, UE-group-specifically, cell-specifically, base station-specifically, cluster-specifically, or system-specifically configured primary carriers or anchor carriers. Alternatively, the L1 CA control information may also be configured to be transmitted only through a backward compatible carrier or an LTE-A only carrier.

Furthermore, in the methods for transmitting the L1 CA control information proposed in the description of the present invention, a carrier aggregation status, which is indicated by the L1 CA control information after F (F≥0) number of downlink or uplink sub-frames, immediately after the user equipment has received the L1 CA control information, or immediately after the base station has transmitted the L1 CA control information, may be applied to the user equipment and the base station.

When the L1 CA Control Information is Being Transmitted

Hereinafter, exemplary cases that require the L1 CA control information according to the present invention to be transmitted will now be described in detail.

1) When the base station semi-statically assigns a candidate carrier, which is to be used for performing carrier aggregation, to the user equipment by using a method, such as UE-specific radio resource control signaling, a case when not all of the carriers assigned to the user equipment are used may dynamically occur. In this case, in order to prevent the user equipment from monitoring the carriers that are not used, the L1 CA control information may be used.

2) When the base station semi-statically assigns a candidate carrier, which is to be used for performing carrier aggregation, to the user equipment by using a method, such as UE-specific radio resource control signaling, a situation in which one or more additional carriers are required to be additionally assigned (e.g., when information of an unexpectedly high data rate is required to be transmitted), in addition to the carriers already assigned to the user equipment, may occur. In this case, the L1 CA control information may be used so that the base station can allocate additional carriers to the user equipment.

3) In an environment where the number of occurrence of the above-described situation 1) or situation 2) is extremely low, basically the base station transmits information on a candidate carrier to the user equipment by using UE-specific radio resource control signaling, and the user equipment may perform decoding on the corresponding carriers. However, in this situation, when an override on the basically configured carrier assignment is required in a specific situation of the system, the base station may limitedly transmit the L1 CA control information to the user equipment. For example, in an event-triggering method, when the L1 CA control information is not required, the base station may deactivate the L1 CA control information. In another example, the base station may include information on a valid time of the L1 CA control information in the L1 CA control information, the L1 CA control information may be valid only during a specific time period.

4) Regardless of the above-described situations 1) to 3), it will be apparent that the L1 CA control information may be dynamically or semi-statically transmitted at a predetermined cycle period.

More Detailed Exemplary Embodiment for Applying the L1 CA Control Information

Hereinafter, an exemplary embodiment applying the above-described format and transmission method of the L1 CA control information will now be described in detail. In order to do so, a specific application method of the above-described methods proposed in the present invention with respect to carrier assignment will first be described in detail. Hereinafter, the term 'carrier assignment information' collectively refers to the above-described UE-specific carrier assignment information, UE-group-specific carrier assignment information, and other concepts similar to the UE-specific carrier assignment information and the UE-group-specific carrier assignment information.

1. The allocation information of a carrier may be delivered to a radio resource control layer. At this point, the carrier assignment information may be transmitted to the user equipment by using UE-specific or UE-Group-specific signaling (radio resource control layer control signaling or first layer/second layer control signaling).

2. The allocation information of a carrier may be configured of an aggregation with another random set of control information.

3. The usage status (on/off, awake/sleep or activated/deactivated) of each carrier, which is assigned to the user equipment via carrier assignment information, may be configured in carrier group units or may be independently configured for each carrier.

For example, the base station may designate a specific carrier as a downlink (DL) primary carrier and, then, decides an uplink primary carrier corresponding to the DL primary carrier. Thereafter, the downlink/uplink primary carriers may be notified to the user equipment by using the radio resource control signaling method. In this case, the base station may apply L1 CA control information that can collectively turn on/off the uplink/downlink component carriers, which are assigned to the user equipment by using RRC signaling, with the exception for the uplink/downlink primary carriers. At this point, the transmission of the L1 CA control information may be performed by using any one of the methods described in the above-described exemplary embodiments of the present invention. Alternatively, the base station may also apply L1 CA control information that can individually control on/off statuses of the uplink/downlink component carriers (having the same meaning as the carriers used in the description of the present invention), which are assigned to the user equipment by using RRC signaling.

4. The usage status of a specific carrier may be performed (or determined) by using a control signaling method on an individual carrier, such as carrier sleep.

1) A carrier sleep command may be transmitted to a user equipment through a random carrier. However, when the carrier sleep command is transmitted to the user equipment through a downlink carrier, which is linked to a downlink carrier having the carrier sleep command applied thereto, or which is lined to an uplink carrier having the carrier sleep command applied thereto, the individuality of each carrier may be ensured and the delivered information size (i.e., overhead) may be decreased.

2) It may be preferable that the carrier sleep command correspond to control information on an individual single carrier. However, the carrier sleep may also correspond to control information on a plurality of carriers. In case of the individual single carrier, the carrier sleep command may correspond to a downlink or uplink primary carrier (or anchor carrier). Also, on the contrary, the individual carrier having the carrier sleep command applied thereto may also correspond to the remaining carriers excluding the downlink or uplink primary carrier. At this point, the corresponding control information on the individual carrier may be transmitted to a downlink primary carrier.

3) The carrier sleep may be transmitted to the user equipment in an implementation format, wherein the above-described L1 CA control information is imbedded in a physical downlink control channel (PDCCH), in a physical dedicated control channel, or in a control channel having a DL channel assignment (or allocation)/UL grant information transmitted thereto. Or, the carrier sleep command may be transmitted to a CRC-protected message.

4) The carrier sleep operation may be performed and/or initiated by both the user equipment/base station.

5) The user equipment does not perform any processing on the carrier, which is in the carrier sleep mode, and when a randomly designated sleep mode period is ended, the corresponding carrier may once again be subject to processing (i.e., return to the normal mode operation). The sleep mode may also be maintained until the next signaling without having to set up a particular sleep mode period.

6) Herein a carrier awake command may be defined, wherein, when a primary is configured, among one or more uplink/downlink carriers that are UE-specifically assigned to a random user equipment, the carrier awake command may generally or individually activate at least some of the carriers that operate in the carrier sleep mode, among the remaining carriers excluding the primary carrier. The methods proposed in the present invention as a method for transmitting the above-described carrier sleep command or the L1 CA control information may be identically or similarly applied to the method for transmitting such carrier awake command.

5. The usage status of a specific carrier may be notified to the user equipment by using a method of configuring additional carriers, apart from the carrier(s) defined within the UE-specific carrier assignment information, which is configured through UE-specific RRC signaling as well as through control signaling respective to an individual carrier, such as carrier sleep. Alternatively, by transmitting an awake command, which 'wakes up' at least some of the carriers that are being operated in a sleep mode, among the carriers that are defined within the UE-specific carrier assignment information, which is configured by using UE-specific RRC signaling, the base station may indicate a usage status of a specific carrier to the user equipment. In some cases, the signaling method performed by using the above-described L1 CA control information may be applied to both the carrier sleep command and the carrier awake command.

1) The carrier sleep/awake command may be transmitted to the user equipment through a random carrier. Most particularly, however, due to the characteristic of the awake command, the awake command may be delivered to the user equipment through a predetermined carrier or though a downlink primary carrier. By using this method, the signaling overhead may be reduced.

2) Herein, it may be preferable that the carrier sleep/ awake command corresponds to control information on a single carrier. However, the carrier sleep/awake command may also simultaneously include the control information respective to two or more carriers.

3) The format of the carrier sleep/awake command may be configured to have the format through which the above-described L1 CA control information may be delivered, or may be configured to have a CRC-protected message format.

4) The carrier sleep/awake operation may be initiated by both the user equipment and the base station.

5) The user equipment does not perform any processing on the carrier, which is in the carrier sleep mode, and when a randomly designated sleep mode period is ended, the corresponding carrier may once again be subject to processing (i.e., return to the normal mode operation). The sleep mode may also be maintained until the next signaling without having to set up a particular sleep mode period. Similarly, when a randomly designated awake mode period is ended, the corresponding carrier may return to the sleep or off status. Also, the awake mode may also be maintained until the next signaling without having to set up a particular awake mode period.

6) The methods proposed in the present invention with respect to the L1 CA control information transmission may also be applied to the transmission of the carrier awake/sleep mode.

Carrier Sleep/Awake

Hereinafter, the carrier sleep/awake status will be described in detail.

Information that is included in the L1 CA control information in order to override the carrier assignment information, which is configured in a radio resource control layer, may correspond to information related to "carrier sleep" and/or "carrier awake".

1) "Carrier sleep" corresponds to a function of turning off a specific carrier for a predetermined period of time by using a signaling method, such as UE-specific radio resource control signaling. Herein, the specific carrier is selected from one or more candidate carriers assigned to the user equipment, or from all available carriers configured in the base station. When the carrier is turned off, the user equipment does not perform any processing operations (e.g., monitoring of the control channel) on the corresponding carrier. In an example of a carrier sleep, among n number of carriers, which is semi-statically assigned to a specific user equipment (UE), the user equipment may turn off k number of carriers (k≤n) for a time period of t1 (t1≤T, T=radio resource control signaling transmission cycle period). At this point, among the carriers that may correspond to the subject carrier that is to be turned off, a method preventing carrier sleep from being applied to the specifically configured carrier or the primary carrier may also be used.

Hereinafter, the carrier sleep (deactivation) status will now be described in more detail.

When a plurality of downlink component carriers and/or a plurality of uplink component carriers, which are configured by a random cell (or relay station node), exist, activation/deactivation may be performed on random carriers, which is configured by the corresponding cell, or may be performed on random carriers, which are already assigned in order to UE-specifically or cell-specifically transmit physical channels and physical signals. In a situation where random downlink carriers are deactivated, downlink synchronization does not occur, and, in some cases, channel measurement may not occur as well. Such channel measurement may essentially refer to a second layer measurement (L2 measurement: channel quality indicator/precoder matrix indicator/rank indicator or channel status information). However, in some cases, a third layer measurement (L3 measurement: RSRP/RSRQ) may not be performed as well. Herein, the deactivation of random downlink carriers may refer to a situation in which the cell (or relay station node as a downlink transmission subject) does not transmit a physical downlink channel (PDCCH and/or PDSCH) to a specific user equipment or all user equipments, or the deactivation of random downlink carriers may refer to a situation in which a user equipment (or relay station node as a downlink reception subject) does not prepare or expect to receive a physical downlink channel (PDCCH and/or PDSCH). When random uplink carriers are deactivated, uplink synchronization is not performed, and, in some cases, channel measurement (SRS transmission) is not performed as well. Herein, the deactivation of random uplink carriers may refer to a situation in which a user equipment (or relay station node as an uplink transmission subject) does not transmit a physical uplink channel (PUCCH and/or PUSCH), or the deactivation of random uplink carriers may refer to a situation in which a cell (or relay station node as an uplink reception subject) does not prepare or expect to receive a physical uplink channel (PUCCH and/or PUSCH).

Hereinafter, the operations of a user equipment in a carrier sleep (deactivation) mode will now be described in detail.

Physical downlink control channel (PDCCH) based L1 CA control information may be dynamically transmitted to a specific user equipment or a user equipment group, or transmitted by using event-triggering, or an activation indicator of a specific carrier may be semi-statically transmitted to a specific user equipment or a user equipment group by using higher layer signaling. Conversely, based upon the operations of a specific cell, the user equipment may implicitly recognize the activation of a specific carrier. As an example of such specific cell operation, a physical downlink control channel including general downlink carrier assignment information or a physical downlink control channel including uplink grant information does not schedule a physical uplink/downlink shared channel transmission from the corresponding carrier. By performing the above-described process, the user equipment, which has recognized the deactivation of the specific carrier, After recognizing the deactivation of the specific carrier by performing the above-described process, the user equipment does not perform any further downlink reception detection or uplink physical signal transmission for downlink or uplink synchronization with respect to the corresponding carrier. At the same time, the user equipment does not receive any of the physical channels and physical signals, which correspond to reception targets, within the corresponding downlink carrier, and, in case of the uplink carrier, none of the physical channels and none of the physical signals are transmitted. Herein, when it is said that all physical channels and physical signals corresponding to the reception target are not received, this may indicate that the user equipment does not perform blind decoding of the physical downlink control channel and buffering of all physical signals and physical channels.

In such deactivation situation, in order to detect a physical downlink control channel for realizing activation or to detect a physical downlink control channel, which implicitly includes downlink channel assignment scheduling information or uplink grant information, a time section (e.g., sub-frame unit) enabling the user equipment to periodically and automatically monitor a control channel for a predetermined period of time may be designated, or a pattern using the designated time section may be designated. At this point, a downlink synchronization process for periodically monitoring the physical downlink control channel within the deactivation section, may be defined during or immediately before the time section, in which the control channel is being monitored by using the above-described monitoring pattern.

Alternatively, during a deactivation section of the corresponding carrier, an idle state may be continuously maintain without having to configure the above-described periodic physical downlink control channel monitoring section. At this point, the operation performed by the user equipment for detecting a physical downlink control channel in order to realize activation or for detecting a physical downlink control channel, which implicitly includes downlink channel assignment scheduling information or uplink grant information, may be performed by another downlink component carrier, which is in an activated state. Accordingly, this is advantageous in the aspect of reception complexity and power consumption in the user equipment.

2) A "carrier awake" command may correspond to a function of being additionally assigned with a specific carrier, which is not assigned to the user equipment, for a limited period of time by using a signaling method, such as UE-specific radio resource control signaling. Or, the "carrier awake" command may correspond to a function of activating once again a specific carrier, which had been deactivated by a sleep command, among multiple candidate carriers that are assigned to the user equipment by using UE-specific radio resource control signaling. For example, among n number of carriers, which is semi-statically assigned to a specific user equipment (UE), k number of carriers (k≤n) may be turned off for a time period of t1 (t1≤T, T=radio resource control signaling transmission cycle period).

Hereinafter, the carrier awake (or activation) status will now be described in more detail.

When a plurality of downlink component carriers and/or a plurality of uplink component carriers, which are configured by a random cell (or relay station node), exist, activation/deactivation may be performed on random carriers, which is configured by the corresponding cell, or may be performed on random carriers, which are already assigned in order to UE-specifically or cell-specifically transmit physical channels and physical signals. In a situation where random downlink carriers are activated, downlink synchronization and channel measurement (L2 measurement: CQI/PMI/RI and/or CSI (channel status information) or L3 measurement (RSRP/RSRQ)) may be performed through the corresponding carrier. Additionally, the carrier activation state may refer to a state, wherein each physical channel (physical downlink control channel and/or physical downlink shared channel) is transmitted by a cell (or relay station node as a downlink transmission subject), and wherein a user equipment (or relay station node as a downlink reception subject) may receive the transmitted physical channel. When an uplink carrier is activated, uplink synchronization and channel measurement are performed. Herein, the user equipment (or relay station node as an uplink transmission subject) may always transmit a physical uplink channel (PUCCH and/or PUSCH), and a cell (or relay station node as an uplink reception subject) may always received the transmitted physical uplink channel.

Hereinafter, the operations of a user equipment in a carrier awake mode will now be described in detail.

Physical downlink control channel (PDCCH) based L1 CA control information may be dynamically transmitted to a specific user equipment or a user equipment group, or transmitted by using event-triggering, or an activation indicator of a specific carrier may be semi-statically transmitted to a specific user equipment or a user equipment group by using higher layer signaling. Conversely, based upon the operations of a specific cell, the user equipment may implicitly recognize the activation of a specific carrier. As an example of such specific cell operation, a physical downlink control channel including general downlink carrier assignment information or a physical downlink control channel including uplink grant information does not schedule a physical uplink/downlink shared channel transmission from the corresponding carrier. By performing the above-described process, the user equipment, which has recognized the deactivation of the specific carrier, may, first of all, search for a downlink synchronization signal (PSCH or SSCH) and perform channel estimation by using a reference signal (RS), so as to realize downlink or uplink synchronization of the corresponding carrier, or the user equipment may perform a process of transmitting a physical signal so as to realize uplink synchronization. This may correspond to an initial process during an actual activation mode, or may correspond to a process immediately before the transition from an activation mode to a deactivation mode. In a situation where the downlink or uplink synchronization is realized, the user equipment may receive all physical channels and physical signals, which correspond to the reception targets within a downlink, and, in case of an uplink, the user equipment may transmit the required physical channels and physical signals.

Hereinafter, a detailed example of the L1 CA control information as the above-described carrier sleep/awake command will now be described with reference to FIG. 7.

Figure 7:
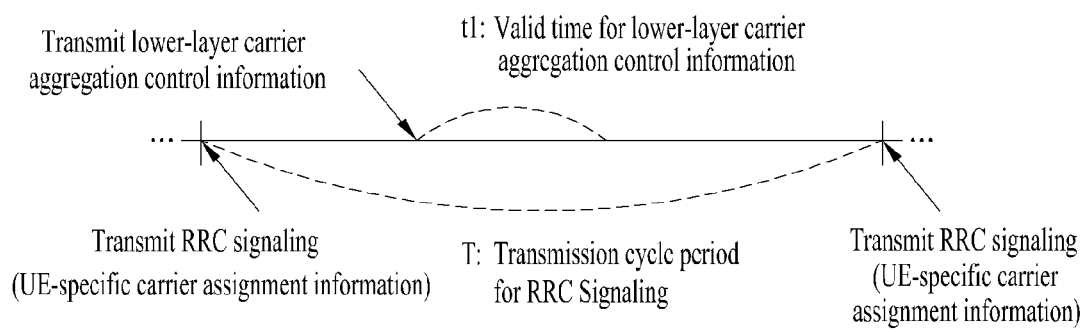
FIG. 7 illustrates exemplary carrier sleep/awake operations according to an exemplary embodiment of the present invention.

FIG. 7 illustrates exemplary carrier sleep/awake operations according to an exemplary embodiment of the present invention.

Referring to FIG. 7, a valid time t1 indicates a time period, which is configured from a transmission sub-frame of the lower-layer carrier aggregation control information, i.e., L1 CA control information. However, this is merely exemplary, and, therefore, the valid time t1 may also indicate an offset starting from a transmission sub-frame of the L1 CA control information according to the present invention, during the transmission performed by the user equipment or cell/base station, to a point where the carrier aggregation state of the corresponding information is applied. Based upon a confirmation on the above-described L1 CA control information, $p(\geq 0)$ or $q(\geq 0)$ number of sub-frames gaps respective to whether or not a confirmation process is performed may be included in the valid time. Conversely, the starting point of a duration of the valid time t1 may be configured immediately after the $p(\geq 0)$ or $q(\geq 0)$ number of sub-frames gaps. In defining a valid section of the above-described L1 CA control information, a method of transmitting a separate set of L1 CA control information for configuring as well as cancelling the valid section may be applied. At this point, the proposed method for transmitting the above-described L1 CA control information may be applied in order to transmit the L1 CA control information.

The configuration, transmission format, and information properties of the L1 CA control information disclosed herein may be applied as the configuration, transmission format, and information properties of the information being transmitted via UE-specific radio resource control signaling transmission, the information being used as the UE-specific or UE-group-specific carrier assignment information. Conversely, the configuration and information properties of the UE-specific radio resource control signaling information, which is used as the UE-specific or UE-group-specific carrier assignment information, may follow the configuration, transmission format, and information properties of the L1 CA control information.

Hereinafter, as another embodiment of the present invention, the mobile station and base station, wherein the above-described embodiments of the present invention may be performed will be described in detail.

The mobile station may operate as a transmitter in the uplink and may operate as a receiver in the downlink. Also, the base station may operate as a receiver in the uplink and may operate as a transmitter in the downlink. More specifically, the mobile station and the base station may include a transmitter and a receiver so as to transmit information or data.

The transmitter and the receiver may include a processor, a module, a part and/or means for performing the embodiments of the present invention. Particularly, the transmitter and the receiver may include a module (or means) for encoding (or encrypting) a message, a module for interpreting an encoded (or encrypted) message, an antenna for transmitting and receiving messages, and so on. An example of such transmitting end and receiving end will be described in detail with reference to FIG. 8.

Figure 8:
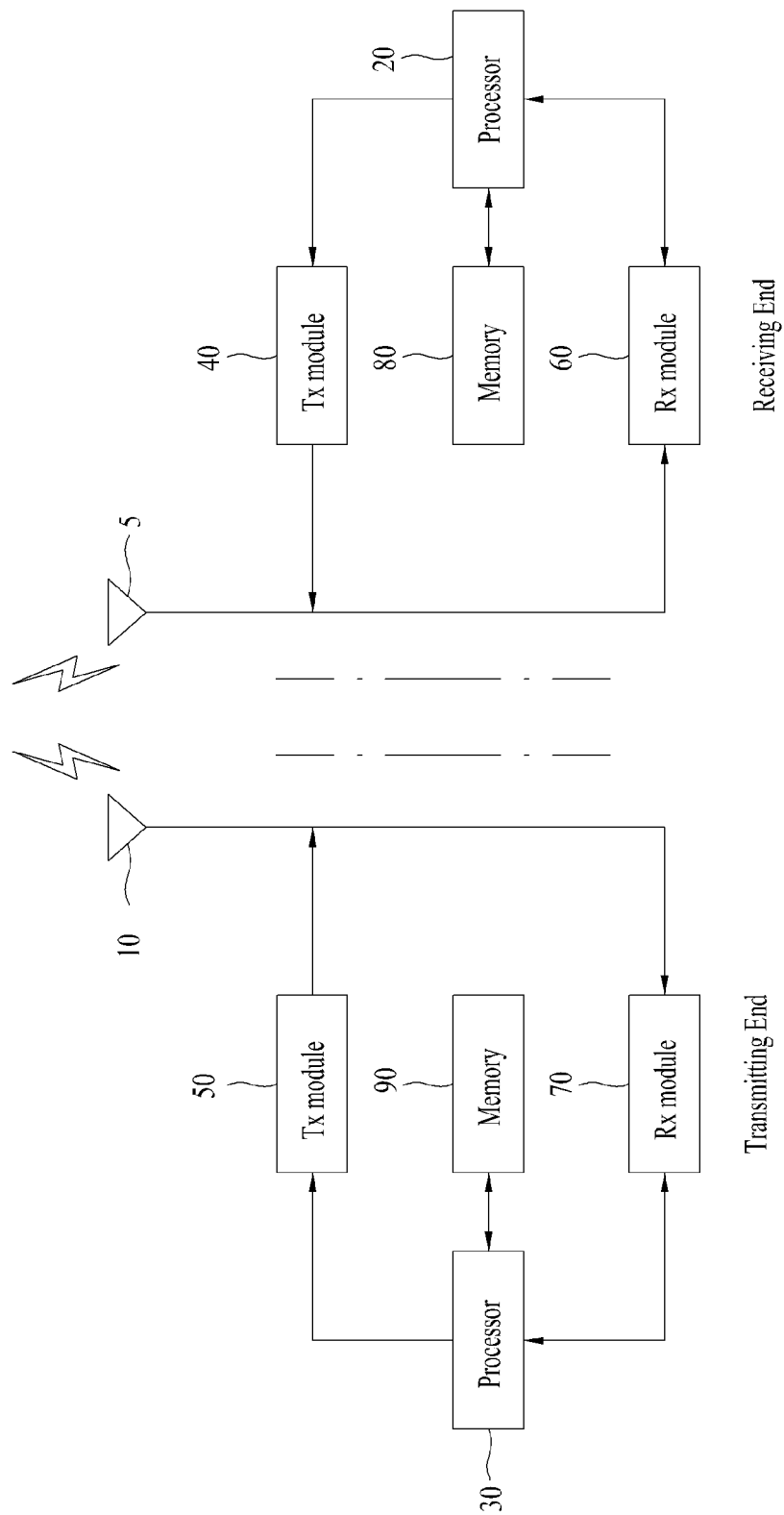
FIG. 8 illustrates a block view showing exemplary structures of a transmitting end and a receiving end according to another exemplary embodiment of the present invention.

FIG. 8 illustrates a block view showing exemplary structures of a transmitting end and a receiving end according to another exemplary embodiment of the present invention.

Referring to FIG. 8, the left side represents the structure of the transmitting end, and the right side represents the structure of the receiving end. Each of the transmitting end and the receiving end may include an antenna (5, 10), a processor (20, 30), a transmission module (Tx module) (40, 50), a receiving module (Rx module) (60, 70), and a memory (80, 90). Each element may perform its corresponding function. Hereinafter, each element will now be described in detail.

The antenna (5, 10) either transmits a signal created from the Tx module (40, 50) to the outside, or receives a wireless signal from the outside, thereby delivering the received signal to the Rx module (60, 70). When a Multiple-Input Multiple-Output (MIMO) antenna function is supported, at least 2 or more antennae may be provided herein.

The above-described antenna, the Tx module, and the Rx module may collectively configure a wireless communication (or radio frequency (RF)) module.

The processor (20, 30) generally controls the overall operations of the transmitting end or the receiving end. Most particularly, in the multi band environment described according to the exemplary embodiments of the present invention, the processor of the mobile terminal (or equipment) controls the overall operations of the user equipment, which are required to perform the initial access procedure, the reception of carrier assignment information following the initial access procedure, and the operation and management of carriers in accordance with the assignment information. Thus, the processor may be capable of exchanging data with the base station and the relay station.

For example, the processor may control the reception module, so that the receiving module can receive a broadcast channel and system information of one or more downlink component carriers from the base station or the relay station, and so that a reference downlink component carrier can be configured, and so that an uplink component carrier that is linked to the configured downlink component carrier can be determined. Accordingly, the processor may select a preamble from a random access channel preamble set, which is indicated by a physical random access channel parameter of the broadcast channel. Then, the processor may control the transmission so that the selected preamble can be transmitted to the base station through an uplink component carrier.

Furthermore, the processor may receive UE-specific/UE-group-specific carrier assignment information through a higher layer signaling (e.g., radio resource control signaling) so as to determine its available carrier. Also, the processor may receive the L1 CA control information so as to control the system so that the base station can perform communication by using a carrier, which is modified (or changed) regardless of the carrier assignment information.

Herein, the higher layer signaling, the format, content, and transmission methods of the L1 CA control information are similar to those described above according to an exemplary embodiment of the present invention. Therefore, a detailed description of the same will be omitted for simplicity.

Meanwhile, the processor of the base station may determine the downlink component carrier to which the user equipment attempts to perform initial access, based upon the contents and/or received timing of message 1 or message 3, which are transmitted from the user equipment. Also, by transmitting UE-specific/UE-group-specific carrier assignment information to the user equipment, the processor may notify the available carrier information. Furthermore, in order to support an asymmetrical carrier environment for an LTE-A user equipment, regardless of the carrier assignment information, or in order to change an on/off state of the carrier assigned to the user equipment, the processor of the base station may transmit L1 CA control information to the user equipment by using a dedicated signaling method.

The Tx module (40, 50) may perform predetermined coding and modulation processes on the data scheduled by the processor (20, 30) and to be transmitted to the outside, thereby delivering the processed data to the antenna (10).

The Rx module (60, 70) may perform decoding and demodulation processes on a wireless signal received from the outside through the antenna (5, 10), so as to recover the processed data to the original (or initial) state, thereby delivering the recovered data to the processor (20, 30).

A program for processing and controlling the processor (20, 30) may be stored in the memory (80, 90). The memory (80, 90) may also perform functions for temporarily storing input/output data (in case of the user equipment, carrier assigned information, system information, temporary cell identifier, L1 CA control information, and so on, which are assigned to the user equipment by the base station). Furthermore, the memory (80, 90) may include at least one type of storage means, such as a flash memory type, a hard disk type, a multimedia card micro type, a card-type memory (e.g., SD or XD memory), a RAM (Random Access Memory), a SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk, and an optical disk.

Meanwhile, the base station may perform a controller function for performing the above-described embodiments of the present invention, an OFDMA (Orthogonal Frequency Division Multiple Access) packet scheduling, Frequency Division Duplex (TDD) packet scheduling, and channel multiplexing functions, MAC frame variable control function based upon service characteristics and frequency environment (or condition), a high-speed traffic real-time control function, a hand over function, authentication and encoding (or encryption) functions, packet modulation/demodulation functions for transmitting data, a high-speed channel coding function, and a real-time modem control function through at least one of the above-described modules, or the base station may further include a separate means, module, or part for performing such functions.

It will be apparent to those skilled in the art that various modifications and variations can be made in the present invention without departing from the technical and essential spirit or scope of the invention. Therefore, the detailed description of the present invention should not be interpreted as limiting in all aspects of the present invention, but should be considered as exemplary. The scope of the appended claims of the present invention shall be decided based upon rational interpretation, and all modifications within the scope of the appended claims and their equivalents will be included in the scope of the present invention.

INDUSTRIAL APPLICABILITY

The method for efficiently transmitting and receiving control information in a multi band environment and a user equipment architecture for the same are described herein mostly based upon an example that may be applied to a 3GPP LTE system. However, in addition to the 3GPP LTE system, the present invention may also be applied to other variety of mobile communication systems having the multi band environment.

What is claimed is:

1. A method for transmitting carrier assignment information by a base station in a wireless communication system supporting multiple carriers, the method comprising:
transmitting carrier assignment information for a user equipment (UE) through a radio resource control (RRC) signaling through a first carrier to the UE, the carrier assignment information being configured depending on capability of the UE, the carrier assignment information including information related to at least one carrier configured for the UE;
transmitting, to the UE, a carrier activation command in a subframe, the carrier activation command instructing the UE to activate a second carrier of the at least one carrier; and
activating the second carrier based on the carrier activation command,
wherein the second carrier is activated after a predetermined number of subframes are received after the subframe that includes the carrier activation command.

2. The method of claim 1, wherein the second carrier is activated within a predefined valid duration.

3. The method of claim 1, wherein the carrier activation command is transmitted through the first carrier.

4. The method of claim 1, wherein:
the carrier assignment information is semi-statically transmitted to the UE; and
the carrier activation command is transmitted according to an event-triggering method.

5. The method of claim 1, wherein the carrier activation command indicates a carrier index of the second carrier.

6. The method of claim 1, wherein the carrier assignment information includes a carrier index of each of the at least one carrier.

7. A method for receiving carrier assignment information by a user equipment (UE) in a wireless communication system supporting multiple carriers, the method comprising:
receiving carrier assignment information for the UE through a radio resource control (RRC) signaling through a first carrier from a base station, the carrier assignment information being configured depending on capability of the UE, the carrier assignment information including information related to at least one carrier configured for the UE;
receiving, from the base station, a carrier activation command in a subframe, the carrier activation command instructing the UE to activate a second carrier of the at least one carrier; and
activating the second carrier based on the carrier activation command,
wherein the second carrier is activated after a predetermined number of subframes are received after the subframe that includes the carrier activation command.

8. The method of claim 7, wherein the second carrier is activated within a predefined valid duration.

9. The method of claim 7, wherein the carrier activation command is received through the first carrier.

10. The method of claim 7, wherein:
the carrier assignment information is semi-statically received; and
the carrier activation command is received according to an event-triggering method.

11. The method of claim 7, wherein the carrier activation command indicates a carrier index of the second carrier.

12. The method of claim 7, wherein the carrier assignment information includes a carrier index of each of the at least one carrier.

13. A user equipment (UE) for receiving carrier assignment information in a wireless communication system supporting multiple carriers, the UE comprising:

a radio communication module; and a processor operatively connected to the radio communication module and configured to:

receive carrier assignment information for the UE through a radio resource control (RRC) signaling through a first carrier from a base station, the carrier assignment information being configured depending on capability of the UE, the carrier assignment information including information related to at least one carrier configured for the UE;

receive, from the base station, a carrier activation command in a subframe, the carrier activation command instructing the UE to activate a second carrier of the at least one carrier; and activate the second carrier based on the carrier activation command, wherein the second carrier is activated after a predetermined number of subframes are received after the subframe that includes the carrier activation command.

14. The UE of claim 13, wherein the processor is further configured to activate the second carrier within a predefined valid duration.

15. The UE of claim 13, wherein:

the carrier assignment information is semi-statically received; and the carrier activation command is received according to an event-triggering method.

16. The UE of claim 13, wherein the carrier activation command indicates a carrier index of the second carrier.

17. The UE of claim 13, wherein the carrier assignment information includes a carrier index of each of the at least one carrier.

18. A base station for transmitting carrier assignment information in a wireless communication system supporting multiple carriers, the base station comprising:

a radio communication module; and a processor operatively connected to the radio communication module and configured to:

transmit carrier assignment information for a user equipment (UE) through a radio resource control (RRC) signaling through a first carrier to the UE, the carrier assignment information being configured depending on capability of the UE, the carrier assignment information including information related to at least one carrier configured for the UE;

transmit, to the UE, a carrier activation command in a subframe, the carrier activation command instructing the UE to activate a second carrier of the at least one carrier; and activate the second carrier based on the carrier activation command, wherein the second carrier is activated after a predetermined number of subframes are received after the subframe that includes the carrier activation command.

19. The base station of claim 18, wherein the processor is further configured to activate the second carrier within a predefined valid duration.

20. The base station of claim 18, wherein the carrier activation command is transmitted through the first carrier.

* * * * *